United States Patent
Archer

(10) Patent No.: US 12,500,406 B2
(45) Date of Patent: Dec. 16, 2025

(54) SYSTEMS, METHODS, APPARATUSES, AND DEVICES FOR CONTROLLING CHANGE IN AN IMPEDANCE OF A POWER SUPPLY CIRCUIT DURING A FAULT

(71) Applicant: John Richard Archer, Spencer, IN (US)

(72) Inventor: John Richard Archer, Spencer, IN (US)

( * ) Notice: Subject to any disclaimer, the term of this patent is extended or adjusted under 35 U.S.C. 154(b) by 0 days.

(21) Appl. No.: 19/005,653

(22) Filed: Dec. 30, 2024

(65) Prior Publication Data

US 2025/0246899 A1 Jul. 31, 2025

Related U.S. Application Data

(60) Provisional application No. 63/626,962, filed on Jan. 30, 2024.

(51) Int. Cl.
| | |
|---|---|
| *H02H 9/02* | (2006.01) |
| *H01F 27/24* | (2006.01) |
| *H01F 27/32* | (2006.01) |
| *H02H 1/00* | (2006.01) |

(52) U.S. Cl.
CPC ............ *H02H 9/021* (2013.01); *H01F 27/24* (2013.01); *H01F 27/325* (2013.01); *H02H 1/0007* (2013.01)

(58) Field of Classification Search
CPC ...... H02H 9/021; H02H 1/0007; H01F 27/24; H01F 27/325
See application file for complete search history.

(56) References Cited

U.S. PATENT DOCUMENTS

| | | | | |
|---|---|---|---|---|
| 4,261,038 A | | 4/1981 | Johns et al. | |
| 4,313,146 A | | 1/1982 | Lee | |
| 4,617,636 A | * | 10/1986 | Johns | H02H 3/40 |
| | | | | 324/556 |
| 2011/0227587 A1 | * | 9/2011 | Nakanishi | G01R 31/389 |
| | | | | 324/649 |

FOREIGN PATENT DOCUMENTS

| | | | | |
|---|---|---|---|---|
| CN | 109085460 A | * | 12/2018 | .......... G01R 31/085 |
| CN | 113156270 A | * | 7/2021 | .......... G01R 31/086 |
| EP | 0299060 B1 | | 11/1995 | |
| FR | 1280423 A | | 12/1961 | |
| WO | 1998011448 A1 | | 3/1998 | |

\* cited by examiner

*Primary Examiner* — Jared Fureman
*Assistant Examiner* — Nicolas Bellido

(57) ABSTRACT

A device for controlling change in an impedance of a power supply circuit during a fault. Further, the device includes a current jump control (CJC) component. Further, the CJC component is configured to be electrically connected with the power supply circuit in a series connection on a power source side of the power supply circuit between a power source and the power supply circuit for controlling the change in the impedance of the power supply circuit during the fault. Further, the CJC component includes an inductor. Further, the inductor is associated with at least one specific value of at least one characteristic of the inductor. Further, the at least one specific value of the at least one characteristic is based on at least one equation describing a transient input impedance associated with a practical, faulted, and finite length charged transmission line.

20 Claims, 19 Drawing Sheets

SYSTEMS, METHODS, APPARATUSES, AND DEVICES FOR CONTROLLING CHANGE IN AN IMPEDANCE OF A POWER SUPPLY CIRCUIT DURING A FAULT

REFERENCE TO RELATED APPLICATIONS

This application claims the benefit of U.S. Provisional Patent Application No. 63/626,962, titled "A DEVICE FOR FACILITATING CONTROLLING CHANGE IN AN IMPEDANCE OF A POWER SUPPLY CIRCUIT DURING A FAULT", filed Jan. 30, 2024, which is incorporated by reference herein in its entirety.

FIELD OF THE INVENTION

The present invention relates generally to the field of electricity: power supply and regulation system. More specifically, the present invention is systems, methods, apparatuses, and devices for controlling change in an impedance of a power supply circuit during a fault.

BACKGROUND OF THE INVENTION

Existing techniques for controlling a fault current in a power supply circuit are deficient with regard to several aspects. For instance, basic rectified power supplies do not prevent an almost immediate jump of the current to an allowable fault current when a loaded, working power feed line is severely faulted. Furthermore, the current passive technologies are also limited by using an iron cored inductor for controlling the fault current. Moreover, the current technologies for controlling the current in the power supply circuit are implemented without identifying a reason for the immediate jump of the current.

Therefore, there is a need for systems, methods, apparatuses, and devices for controlling change in an impedance of a power supply circuit during a fault that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a device for controlling change in an impedance of a power supply circuit during a fault, in accordance with some embodiments. Accordingly, the device may include a current jump control (CJC) component. Further, the current jump control (CJC) component may be configured to be electrically connected with the power supply circuit in a series connection on a power source side of the power supply circuit between a power source and the power supply circuit for controlling the change in the impedance of the power supply circuit during the fault. Further, the CJC component may include at least one inductor. Further, the at least one inductor may be associated with at least one specific value of at least one characteristic of the at least one inductor. Further, the at least one specific value of the at least one characteristic may be based on at least one equation describing a transient input impedance associated with a practical, faulted, and finite length charged transmission line.

Further disclosed herein is a device for controlling change in an impedance of a power supply circuit during a fault, in accordance with some embodiments. Accordingly, the device may include a current jump control (CJC) component. Further, the current jump control (CJC) component may be configured to be electrically connected with the power supply circuit in a series connection on a power source side of the power supply circuit between a power source and the power supply circuit for controlling the change in the impedance of the power supply circuit during the fault. Further, the CJC component may include at least one inductor associated with at least one specific value of at least one characteristic of the at least one inductor. Further, the at least one specific value of the at least one characteristic may be based on at least one equation describing a transient input impedance associated with a practical, faulted, and finite length charged transmission line. Further, the CJC component may include at least one additional inductor electrically coupled with the at least one inductor. Further, the at least one additional inductor may be configured for producing a low impedance pulse based on a fault onset of the fault. Further, the low impedance pulse may be used for at least one warning. Further, the CJC component may include at least one additional resistor electrically coupled with the at least one inductor and the at least one additional inductor. Further, the at least one additional resistor may be in series connection with the at least one additional inductor. Further, the at least one additional resistor and the at least one additional inductor may be in a parallel connection with the at least one inductor. Further, the CJC component may include at least one resistor electrically coupled with the at least one additional inductor. Further, the at least one resistor may be in a parallel connection with the at least one additional inductor.

Further disclosed herein is a device for controlling change in an impedance of a power supply circuit during a fault, in accordance with some embodiments. Accordingly, the device may include a current jump control (CJC) component and a processing device. Further, the current jump control (CJC) component may be configured to be electrically connected with the power supply circuit in a series connection on a power source side of the power supply circuit between a power source and the power supply circuit for controlling the change in the impedance of the power supply circuit during the fault. Further, the CJC component may include at least one inductor. Further, the at least one inductor may be associated with at least one specific value of at least one characteristic of the at least one inductor. Further, the at least one specific value of the at least one characteristic may be based on at least one equation describing a transient input impedance associated with a practical, faulted, and finite length charged transmission line. Further, the at least one inductor may be configured for allowing varying at least one value of the least one characteristic of the at least one inductor. Further, the processing device may be operatively coupled with the CJC component. Further, the processing device may be configured for analyzing at least one input. Further, the processing device may be configured for determining the at least one specific valve of the at least one characteristic of the at least one inductor based on the analyzing of the at least one input. Further, the processing device may be configured for generating at least one signal for the at least one inductor based on the determining of the at least one specific value of the at least one characteristic. Further, the at least one inductor may be configured for setting the at least one value of the at least one characteristic to the at least one specific valve of the at least one characteristic based on the at least one signal and the allowing of the varying of the at least one value of the at least one characteristic.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

DETAIL DESCRIPTIONS OF THE INVENTION

Figure 1:
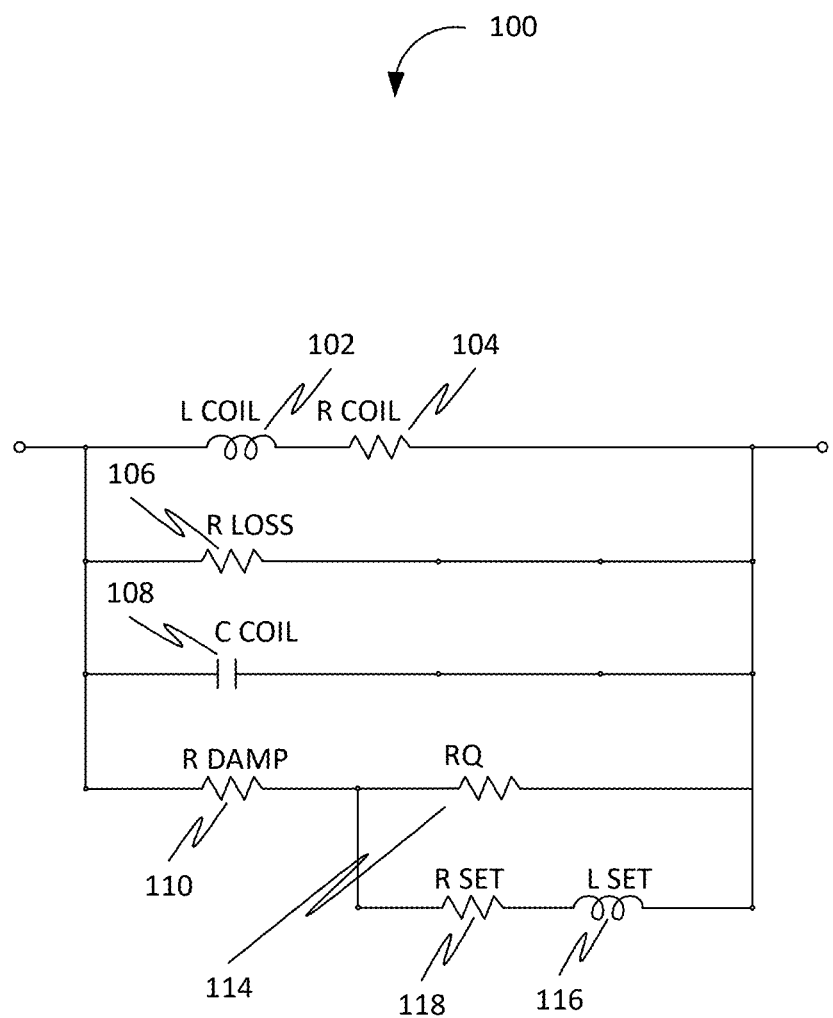
FIG. 1 is a circuit diagram of a device 100 for facilitating controlling change in an impedance of a power supply circuit during a fault, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods.

Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of systems, methods, apparatuses, and devices for controlling change in an impedance of a power supply circuit during a fault, embodiments of the present disclosure are not limited to use only in this context.

Overview:

The present disclosure describes a device for facilitating controlling change in an impedance of a power supply circuit during a fault. Further, the device prevents an almost immediate jump of the current to an allowable fault current when a loaded and working power feed line is severely faulted. Further, the present disclosure describes the control of the power supply current jump response to a load feed line rapid fault. Further, the present disclosure describes a passive initial current jump control component that uses a ferrite cored coil and produces a control signal at the fault onset which could be used to effect circuit shutdown.

Further, the device lowers the loop circuit impedance at the onset of the fault. Further, the device has a direct current circuit component that is inductive/resistive to allow current flow. Further, the device adds a series inductor to the circuit after the power source that collects some of any loop circuit voltage change as required by the Kirchhoff zero loop voltage summation law. If the circuit allows, a large series-connected inductor might lower the initial fault onset current to a value less than the static value.

Further, the inductor may be shunted by a resistive circuit to raise the fault onset current to a value closer to the original static value and minimize any jump current increase. Further, by setting the line loss insulation admittance component, G1 to zero, the solution of faulted and charged transient complex variable transmission line equations is greatly simplified. Further, by using the following attributes:

Every electrical or mechanical fault action takes time; current values cannot change immediately.

Practical approaching electrical fault actions must start with a very small initial approach current; an electrical arc event is an obvious example, and a zero value of the power feed line loss admittance factor, G1, the input impedance of a faulted and charged finite-length transmission line is found assuming a zero line current change at the fault onset time. This derived input impedance equation is used here as a series component in powered direct current loop circuits. If a given circuit problem does not allow a zero fault onset current change, then normal linear loop circuit analysis will handle this via superposition. Using this equation, the reason for the almost instantaneous jump current increase in a faulted and unprotected loop powered circuit became obvious. A very small approaching fault current also effectively allowed a peek at the (t=0- to 0) fault transition and allowed the view of a large initial increase in the faulted load voltage and a very large spike energy increase. Further, the device reduces these undesirable effects and can protect more than one current-sharing circuit. The device includes a gapped ferrite core assembly with a helpful shape that can use standard production parts. The magnetic reluctance of the open core window area is used to provide a very large increase in the initial calculated value of the main current carrying coil inductance, here to about 300%. This enables a lower coil resistive power loss when a large circuit fault current flows before circuit protection devices operate. This delay might be several hundred milliseconds. Further, a magnetic core of this shape might be very difficult to form and assemble using transformer steel laminations.

Further, the present disclosure explains the normal unprotected circuit fault onset current jump and describes the controlling of the current jump. Further, the present disclosure also describes controlling initial high load voltage and energy spike. The almost immediate jump in supply current value could obviously be of concern in high-power circuits. The equation development described applies to all power levels. The low power source used here was chosen to show that protection was also important at this level. The circuit values can be adapted to handle a very large range of supply voltages and currents. Control was achieved by the use of a very low inductance coil assembly using a ferrite core. Further, the present disclosure uses thoughts, published references, and basic mathematics.

Further, the present disclosure describes a solution that is keyed to the calculation simplification resulting from the practical setting of the power feed line insulation loss admittance, G1, to zero. This simple step has enabled a clearer view of circuit operation via the virtual switch action, shown by the new working charged line input impedance equation. This led to the innovative current jump control (CJC) component design that uses a very low inductance main coil.

Further, the present disclosure describes a novel and mathematically derived passive component. Further, the passive component is a current jump control (CJC) component. Further, the CJC component is serially connected in a faulted closed loop power supply circuit to control the faulted circuit impedance change.

Further, the CJC component is a practical component that controls the sudden rise of power supply current that occurs when a working power feed line receives a sudden overload electrical fault. Calculation of component values is dependent upon the use of a new equation describing the transient input impedance of a practical, faulted, and finite-length charged transmission line with low leakage loss. Component values are tuned to control a particular power supply situation.

Further, the component values also depend upon the use of derived equations and the mathematical and physical reasoning that justified the fault onset condition.

Further, the CJC component sets or controls the net loop circuit impedance at the fault onset time.

Further, the CJC component prevents, sets, delays, or lowers the normal rapid increase of the power supply current to the available fault value.

Further, the CJC component controls the initial large jump in load voltage caused by an approaching fault impedance.

Further, the CJC component controls the value and rate of change of the power supply current at and after the fault onset time.

Further, the CJC component assists in a virtual circuit loop impedance switch action at the fault onset time.

Further, the CJC component provides protection for parallel fed lines sharing the available supply current.

Further, the CJC component uses a ferrite-cored inductor instead of a steel-cored device.

Further, the CJC component does not need to use an added capacitor or a semiconductor device.

Further, the CJC component deliberately uses the open window space reluctance of the CJC component main coil inductance assembly to usefully increase its inductance value with fewer coil turns.

Further, the CJC component produces in one CJC component variation at fault onset, a low impedance pulse due to the use of a specific coil. The immediate availability of this effect can give an advanced warning of a possible high-energy event, such as an electrical arc, before the circuit fault is released, to activate or delay circuit protection or for some other function. If the described two winding forms of the possible coil construction are not used, an extra coil turn around the core can provide a larger DC free pulse or the output of the CJC component will provide a large pulse with a DC component.

Further, an enclosed window area core used in the CJC component is more magnetically efficient by using the air gap space to allow coil connections and an annular trench for burying coil bobbin ends inside a ferrite area to align the wound coil height with the window height.

Further disclosed herein is a device for controlling change in an impedance of a power supply circuit during a fault, in accordance with some embodiments. Accordingly, the device may include a current jump control (CJC) component. Further, the current jump control (CJC) component may be configured to be electrically connected with the power supply circuit in a series connection on a power source side of the power supply circuit between a power source and the power supply circuit for controlling the change in the impedance of the power supply circuit during the fault. Further, the power source may include an alternating current (AC) power source, a direct current (DC) power source, etc. Further, the power source provides electrical power (such as AC power, DC power, etc.) Further, the device operates on the electrical power. Further, the CJC component may be a passive initial current jump control component, a novel and mathematically derived passive component, etc. Further, the CJC component may include at least one inductor. Further, the at least one inductor may be associated with at least one specific value of at least one characteristic of the at least one inductor. Further, the at least one characteristic may include a resistance, an inductance, a capacitance, a reluctance, an impedance, a reactance, a conductance, etc. Further, the at least one characteristic may include a coil resistance (such as Rcoil), a coil inductance (such as Lcoil), a core resistance (such as Rloss), a core capacitance (such as Ccoil), etc. Further, the at least one specific value of the at least one characteristic may be based on at least one equation describing a transient input impedance associated with a practical, faulted, and finite length charged transmission line. Further, the at least one equation may include a transitional charged line input impedance equation, a newly derived transient input impedance equation, etc. Further, the fault may be associated with a power feed line, a load power feed line, a transmission line, etc. Further, in an embodiment, the at least one value of the at least one characteristic may be based on a physical construction of the at least one inductor. Further, the at least one inductor may include a coil inductive component (Lcoil), a coil resistive component (Rcoil), a loss resistive component (Rloss), and a coil capacitive component (Ccoil).

Further, in some embodiments, the at least one specific value of the at least one characteristic may be based on at least one of at least one derived equation and at least one of a physical reasoning and a mathematical reasoning justifying a fault onset condition associated with the fault. Further, the mathematical reasoning corresponds to a mathematical reason, and the physical reasoning corresponds to a physical reason. Further, the physical reasoning corresponds to a physical approach, and the mathematical reasoning corresponds to a mathematical approach to designing the device. Further, at least one of the physical reasoning and the mathematic reasoning may be based on at least one foundation idea. Further, the at least one foundation idea may include: at the fault onset the loop circuit impedance change should be minimized for low current change, added direct current circuit components would be inductive/resistive to allow high current flow, a series inductance added to the circuit after the power source would collect some of any loop circuit voltage change as required by the Kirchhoff zero loop voltage summation law, and have initial stored energy, a few microamps of line insulation resistive leakage current should have no direct practical effect upon the value of line currents that are millions of times larger, Line leakage exists in the transmission line equations as an admittance, G1, but has no practical value here, with the line loss insulation admittance component, G1, set to zero, the transient solution of a faulted, finite-length, active charged transmission line can be greatly simplified, apparent fast changes often need a spark action that allows a necessary circuit reaction time, and practical approaching electrical fault actions must start with a very small local initial approach current; an electrical air path breakdown arcing event is an obvious example.

Further, in some embodiments, the at least one inductor may include at least one ferrite core and at least one coil. Further, the at least one ferrite core may be a gapped ferrite core. Further, the at least one ferrite core may be comprised of ferrite. Further, the at least one ferrite core may be comprised of Ferroxcube 3C95 material. Further, the at least one ferrite core may be comprised of E-I combination with a shared air gap spacer. Further, the at least one coil may be comprised at least one turn of an insulated wire. Further, the at least coil corresponds to a loop, a winding, etc. Further, in an embodiment, the at least one ferrite core may be of an enclosed window area core type. Further, the at least one ferrite core of the enclosed window area core type uses an air gap space to allow one or more coil connections of the at least one coil, and an annular trench for burying one or more coil bobbin ends of a coil bobbin of the at least one ferrite core inside a ferrite area of the at least one ferrite core to align a winding height of a winding of the at least one coil with a window height of a window of the at least one ferrite core.

Further, in some embodiments, the CJC component may include at least one additional inductor electrically coupled with the at least one inductor. Further, the at least one additional inductor may be configured for producing a low impedance pulse based on a fault onset of the fault. Further, the low impedance pulse may be used for at least one warning. Further, the at least one additional inductor may include a resistively damped inductor. Further, the at least one additional inductor may include a coil inductance (Lset) and a coil resistance (Rset). Further, the coil inductance (Lset) and the coil resistance (Rset) may be associated with at least one additional value. Further, the at least one additional inductor may include an inductive component (Lset) and a resistive component (Rset). Further, the at least one additional inductor may include a tunable inductor. Further, in an embodiment, the at least one additional inductor may include at least one additional coil. Further, the at least one additional coil may be air-cored. Further, the at least one additional coil may be comprised at least one turn of an insulated wire. Further, the at least one additional coil may correspond to a loop, a winding, etc.

Further, in an embodiment, the at least one additional inductor may include the at least one additional coil. Further, the least one additional coil may be comprised in a winding of at least two windings of a transformer. Further, the transformer may include a two coil transformer. Further, the transformer may be an electrical transformer. Further, the at least two windings may include two windings, three windings, etc. Further, in an embodiment, the at least one additional inductor may include the at least one additional coil. Further, the at least one additional coil may be wound around the at least one inductor.

Further, in an embodiment, the CJC component may include at least one additional resistor, as shown in electrically coupled with the at least one inductor and the at least one additional inductor. Further, the at least one additional resistor may be in series connection with the at least one additional inductor. Further, the at least one additional resistor and the at least one additional inductor may be in a parallel connection with the at least one inductor. Further, the at least one additional resistor may be a coil damping resistor. Further, the at least one additional resistor may be associated with a coil damping resistance (Rdamp3). Further, the coil damping resistance may be associated with at least one resistor value. Further, the at least one additional resistor may include a variable resistor. Further, the variable resistor allows dynamically changing of a resistance of the variable resistor based on a signal. Further, the signal may include an electrical signal.

Further, in an embodiment, the CJC component may include at least one resistor, as shown in electrically coupled with the at least one additional inductor. Further, the at least one resistor may be in a parallel connection with the at least one additional inductor. Further, the at least one resistor may be a damping resistor. Further, the at least one resistor may be associated with a damping resistance (RQ3). Further, the damping resistance may be associated with at least one resistor value. Further, the at least one resistor may include a variable resistor. Further, the variable resistor allows dynamically changing of a resistance of the variable resistor based on a signal. Further, the signal may include an electrical signal.

Further, in an embodiment, the at least one additional resistor may be flame proof.

Further, in an embodiment, the at least one additional resistor has at least 2% resistance tolerance.

Further, in some embodiments, the at least one inductor may be configured for allowing varying at least one value of the least one characteristic of the at least one inductor. Further, the at least one inductor may include a tunable inductor. Further, the tunable inductor allows a dynamic adjusting of at least one of an inductance, a resistance, a reluctance, and a capacitance of the electrically tunable inductance by applying a signal. Further, the signal may include an electrical signal. Further, the tunable inductor may include a magnetically tunable inductor, a varactor inductor, an electromagnetically tunable inductor, etc.

In an embodiment, the device may include a processing device, as shown in operatively coupled with the CJC component. Further, the processing device may include a processor, a processing unit, a microprocessor, a microcontroller, a controller, etc. Further, the processing device may be configured for analyzing at least one input. Further, the at least one input may include at least one data associated with the power source, the power supply circuit, an electrical load, etc. Further, the processing device may be configured for determining the at least one specific valve of the at least one characteristic of the at least one inductor based on the analyzing of the at least one input. Further, the processing device may be configured for generating at least one signal for the at least one inductor based on the determining of the at least one specific value of the at least one characteristic. Further, the at least one inductor may be configured for setting the at least one value of the at least one characteristic to the at least one specific valve of the at least one characteristic based on the at least one signal and the allowing of the varying of the at least one value of the at least one characteristic. Further, the at least one signal may include an electrical signal.

In an embodiment, the device may include at least one sensor, as shown in communicatively coupled with the processing device. Further, the at least one sensor may include a voltage sensor, a current sensor, a resistance sensor, a reactance sensor, a frequency sensor, a real power sensor, an apparent power sensor, a reactive power sensor, a PF sensor, etc. Further, the at least one sensor may be configured for detecting at least one electrical parameter associated with at least one of the power supply circuit and a load. Further, the at least one electrical parameter may include voltage, current, resistance, reactance, frequency, real power, apparent power, reactive power, PF, etc. Further, the load may include an electrical load. Further, the processing device may be configured for generating the at least one input based on the detecting of the at least one electrical parameter. Further, the analyzing of the at least one input may be based on the generating of the at least one input.

In an embodiment, the device may include at least one input device, as shown in communicatively coupled with the processing device. Further, the at least one input device may be configured for receiving at least one input action. Further, the at least one input action may be received through at least one user. Further, the at least one input action may include a pressing, a gesture, a movement, etc. Further, the at least one input device may be configured for generating the at least one input based on the receiving of the at least one input action. Further, the analyzing of the at least one input may be based on the generating of the at least one input.

In an embodiment, the device may include a storage device, as shown in communicatively coupled with the processing device. Further, the storage device may be configured for storing the at least one equation. Further, the processing device may be configured for determining at least one value of at least one variable based on the analyzing of the at least one input. Further, the processing device may be configured for solving the at least one equation describing the transient input impedance based on the at least one value of the at least one variable. Further, the determining of the at least one specific value of the at least one characteristic may be further based on the solving of the at least one equation.

Further, in some embodiments, the CJC component may be configured for performing a virtual circuit loop impedance switch action at a fault onset time of the fault for the controlling of the change in the impedance of the power supply circuit during the fault.

Further disclosed herein is a device for controlling change in an impedance of a power supply circuit during a fault, in accordance with some embodiments. Accordingly, the device may include a current jump control (CJC) component. Further, the current jump control (CJC) component may be configured to be electrically connected with the power supply circuit in a series connection on a power source side of the power supply circuit between a power source and the power supply circuit for controlling the change in the impedance of the power supply circuit during the fault. Further, the CJC component may include at least one inductor associated with at least one specific value of at least one characteristic of the at least one inductor. Further, the at least one specific value of the at least one characteristic may be based on at least one equation describing a transient input impedance associated with a practical, faulted, and finite length charged transmission line. Further, the CJC component may include at least one additional inductor electrically coupled with the at least one inductor. Further, the at least one additional inductor may be configured for producing a low impedance pulse based on a fault onset of the fault. Further, the low impedance pulse may be used for at least one warning. Further, the CJC component may include at least one additional resistor electrically coupled with the at least one inductor and the at least one additional inductor. Further, the at least one additional resistor may be in series connection with the at least one additional inductor. Further, the at least one additional resistor and the at least one additional inductor may be in a parallel connection with the at least one inductor. Further, the CJC component may include at least one resistor electrically coupled with the at least one additional inductor. Further, the at least one resistor may be in a parallel connection with the at least one additional inductor.

Further, in an embodiment, the at least one additional resistor may be flame proof.

Further, in an embodiment, the at least one additional resistor has at least 2% resistance tolerance.

Further, disclosed herein is a device for controlling change in an impedance of a power supply circuit during a fault, in accordance with some embodiments. Accordingly, the device may include a current jump control (CJC) component and a processing device. Further, the current jump control (CJC) component may be configured to be electrically connected with the power supply circuit in a series connection on a power source side of the power supply circuit between a power source and the power supply circuit for controlling the change in the impedance of the power supply circuit during the fault. Further, the CJC component may include at least one inductor. Further, the at least one inductor may be associated with at least one specific value of at least one characteristic of the at least one inductor. Further, the at least one specific value of the at least one characteristic may be based on at least one equation describing a transient input impedance associated with a practical, faulted, and finite length charged transmission line. Further, the at least one inductor may be configured for allowing varying at least one value of the least one characteristic of the at least one inductor. Further, the processing device may be operatively coupled with the CJC component. Further, the processing device may be configured for analyzing at least one input. Further, the processing device may be configured for determining the at least one specific valve of the at least one characteristic of the at least one inductor based on the analyzing of the at least one input. Further, the processing device may be configured for generating at least one signal for the at least one inductor based on the determining of the at least one specific value of the at least one characteristic. Further, the at least one inductor may be configured for setting the at least one value of the at least one characteristic to the at least one specific valve of the at least one characteristic based on the at least one signal and the allowing of the varying of the at least one value of the at least one characteristic.

Further disclosed herein is a device for facilitating controlling change in an impedance of a power supply circuit during a fault, in accordance with some embodiments. Further, the device may be configured to be connected serially with the power supply circuit on a power source side of the power supply circuit between a power source, as shown in and the power supply circuit. Further, the power source might provide a nominal voltage ranging from 28 volts to 270 volts. Further, the power supply circuit may be a finite-length charged transmission line with a low leakage loss, a loaded power feed line, etc. Further, the fault may be a physical fault. Further, the device may be a current jump control (CJC) component. Further, the device may include a coil assembly and an impedance element. Further, the coil assembly may include a core structure and a coil associated with the core structure. Further, the coil may correspond to a coil inductive component, a coil resistive component, and a coil capacitive component. Further, the coil inductive component may be in series with the coil resistive component. Further, the coil capacitive component may be parallel to the coil inductive component and the coil resistive component. Further, the core structure will have a core loss resistive component. Further, the core resistive component may be parallel to the coil inductive component and the coil resistive component. Further, the coil assembly may be configured for lowering a value of a fault onset current than a static value. Further, in an embodiment, an inductance of the coil inductive component may be determined using the conformal Schwartz-Christoffel reluctance calculation method. Further, the impedance element may be parallelly connected to the coil. Further, the impedance element may be configured for raising the value of the fault onset current closer to the static value after the lowering. Further, the lowering of the value of the fault onset current and the raising of the value of the fault onset current minimizes a sudden rise of a current in the power supply circuit during the fault for controlling change in the impedance of the power supply circuit during the fault.

Further, in some embodiments, the impedance element may include a coil damping resistor, a resistively damped inductor connected in series with the coil damping resistor, and a parallel damping resistor connected in parallel with the resistively damped inductor. Further, the resistively damped inductor may include an inductor component and a resistive component.

Further, in some embodiments, the core structure may include an enclosed window area type core.

Further, in some embodiments, the core structure may include a gapped ferrite core. Further, the gapped ferrite core has a low physical aspect ratio and a large window area. Further, the large window area may be used to provide an increase in an inductance of the coil inductive component. Further, in an embodiment, the core structure has a small value of a core reluctance that effectively puts an open window reluctance associated with the large window area in parallel with an outer core leg reluctance of an outer core leg of the core structure along with an air gap reluctance.

Further, in some embodiments, the resistively damped inductor may be configured for producing a low impedance pulse based on an onset of the fault.

Further, in an embodiment, the resistively damped inductor may be a first coil of a two coil transformer. Further, an input associated with the first coil produces an output at a second coil of the two coil transformer. Further, the input may be the low impedance pulse. Further, the output may be a low impedance DC-free pulse.

Further, in an embodiment, the low impedance DC-free pulse provides a feed to at least one component. Further, the at least one component may include a Silicon Controlled Rectifier (SCR) gate, at least one circuitry, etc.

Further, in an embodiment, the resistively damped inductor may be a first coil and an additional coil associated with the first coil. Further, an input associated with the first coil produces an output at the additional coil. Further, the input may be the low impedance pulse. Further, the output may be a low impedance DC-free pulse.

Further, in some embodiments, each of the coil inductive component, the coil resistive component, the coil capacitive component, the core resistive component, the coil damping resistor, the resistively damped inductor, and the parallel damping resistor may be associated with a value. Further, the value of each of the coil inductive component, the coil resistive component, the coil capacitive component, the core resistive component, the coil damping resistor, the resistively damped inductor, and the parallel damping resistor may be derived from a novel (new) equation. Further, the novel equation describes a transient input impedance of the CJC fed power line with a low leakage loss during the fault.

Further, in an embodiment, the value of each of the coil inductive component, the coil resistive component, the coil capacitive component, the core resistive component, the coil damping resistor, the resistively damped inductor, and the parallel damping resistor may be derived from one or more derived equations at least one a mathematical justification and a logical justification of an onset of the fault.

Further, in some embodiments, a static magnetization of the coil may be set smaller than a knee value of a B-H curve of the core structure.

FIG. 1 is a view of a fully populated CJC component, and is a circuit diagram of a device 100 for facilitating controlling change in an impedance of a power supply circuit during a fault, in accordance with some embodiments. Further, the device 100 may include a coil assembly circuitry. Further, the coil assembly circuitry may include a coil inductor (Lcoil) 102, a coil resistor (Rcoil) 104, a loss resistor (Rloss) 106, and a winding capacitor (Ccoil) 108. Further, the coil inductor 102 may be connected to the coil resistor 104 in series. Further, the loss resistor 106 and the coil capacitor 108 may connected to the coil resistor 104 and the coil inductor 102 in parallel. Further, the coil assembly circuitry corresponds to a coil assembly of the device 100.

Further, the device 100 may include an impedance circuitry. Further, the impedance circuitry may be connected to the coil assembly circuitry in parallel. Further, the impedance circuitry may include a coil damping resistor (Rdamp) 110, a resistively damped inductor connected in series with the coil damping resistor 110, and a parallel damping resistor (RQ) 114 connected in parallel with the resistively damped inductor. Further, the resistively damped inductor may include an inductor component (Lset) 116 and a resistive component (Rset) 118. Further, the impedance circuitry corresponds to an impedance element of the device 100.

Figure 2:
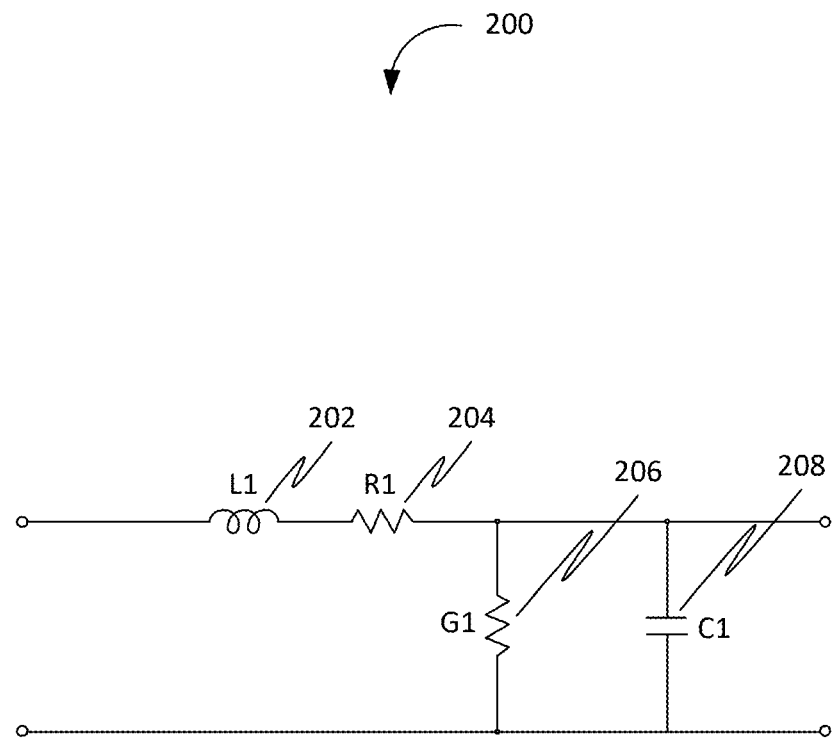
FIG. 2 is a circuit diagram of a power supply circuit 200.

FIG. 2 shows a basic mathematical section of a two wire power line viewed as a transmission line, and is a circuit diagram of a power supply circuit 200. Further, the power supply circuit 200 corresponds to a transmission line, a power feed line, etc. Further, the power supply circuit 200 may include a power source side and a load side. Further, the power supply circuit 200 may include an equivalent inductor (L1) 202, an equivalent resistor (R1) 204, a line loss insulation admittance component (G1) 206, and an equivalent capacitor (C1) 208.

Figure 3:
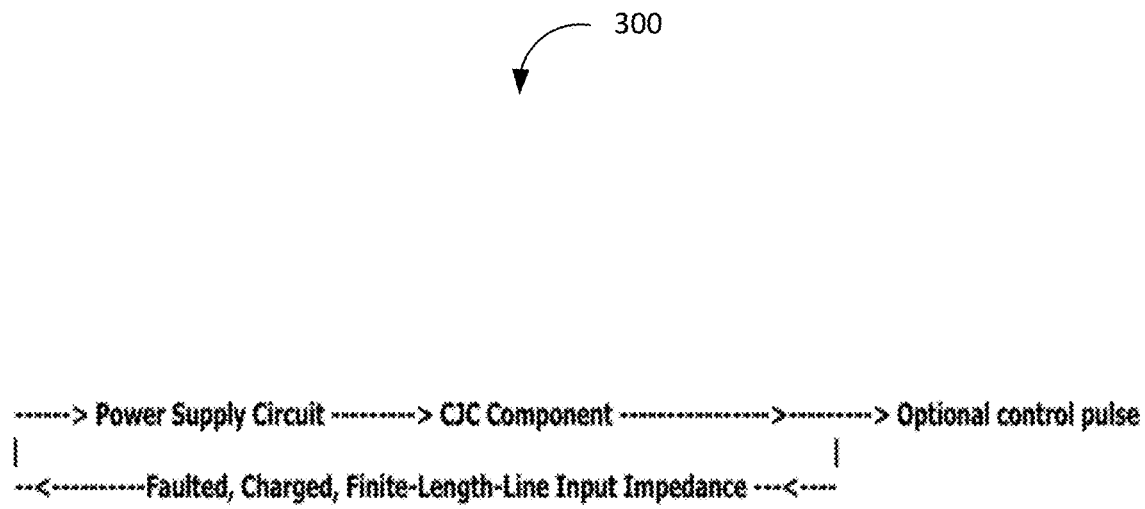
FIG. 3 illustrates a circuit 300 associated with a current jump control (CJC) component for facilitating controlling change in an impedance of a power supply circuit during a fault, in accordance with some embodiments.

FIG. 3 illustrates a circuit 300 associated with a current jump control (CJC) component for facilitating controlling change in an impedance of a power supply circuit during a fault, in accordance with some embodiments.

Figure 4:
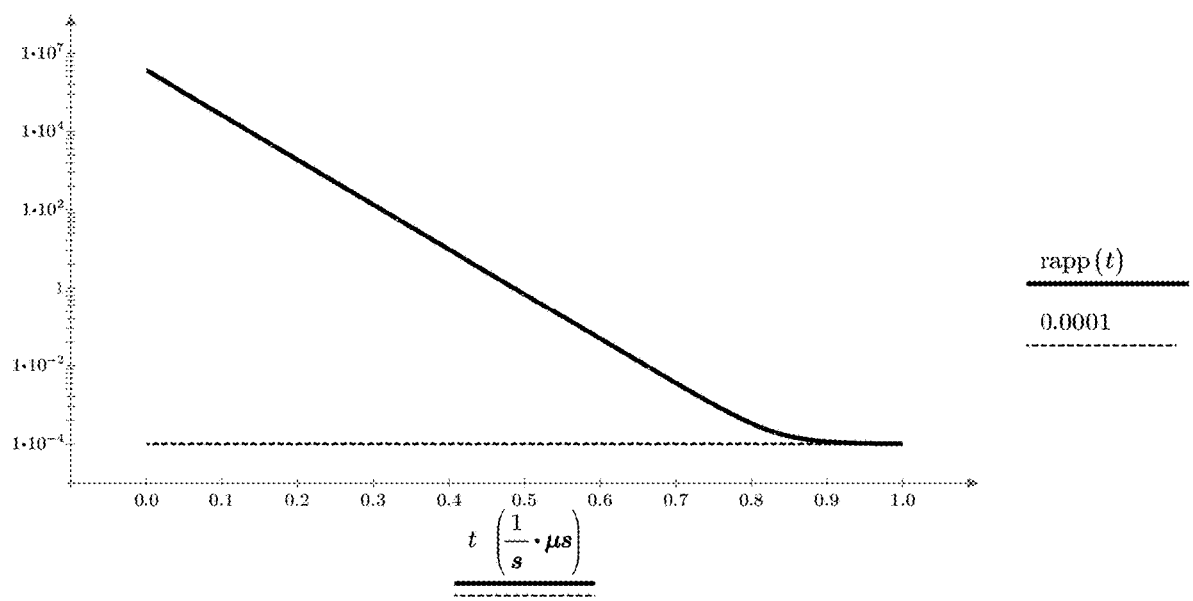
FIG. 4 illustrates a plot 400 associated with a fault profile associated with a system for facilitating controlling change in an impedance of a power supply circuit during a fault, in accordance with some embodiments.

FIG. 4 illustrates a plot 400 associated with a fault profile associated with a system for facilitating controlling change in an impedance of a power supply circuit during a fault, in accordance with some embodiments.

Figure 5:
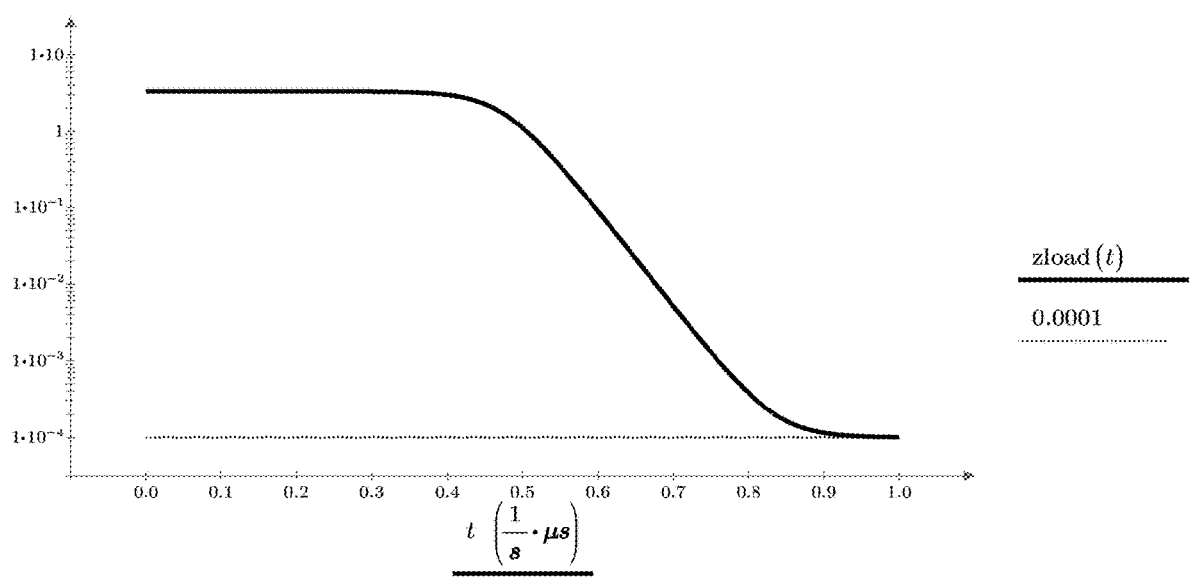
FIG. 5 illustrates a plot 500 associated with a net load resistance associated with the system, in accordance with some embodiments.

FIG. 5 illustrates a plot 500 associated with a net load resistance associated with the system, in accordance with some embodiments.

Figure 6:
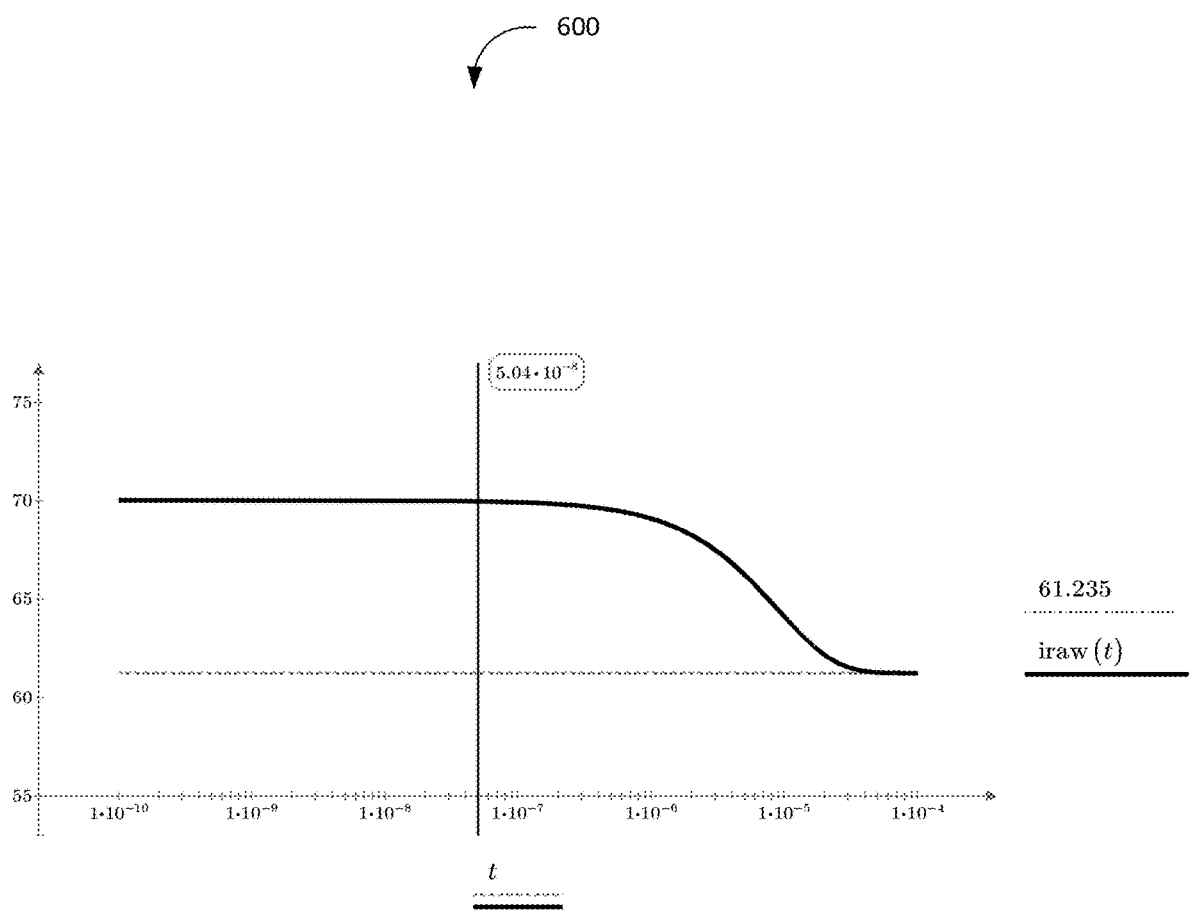
FIG. 6 illustrates a plot 600 associated with a faulted and unprotected power line associated with the system, in accordance with some embodiments.

FIG. 6 illustrates a plot 600 associated with a faulted and unprotected power line associated with the system, in accordance with some embodiments.

Figure 7:
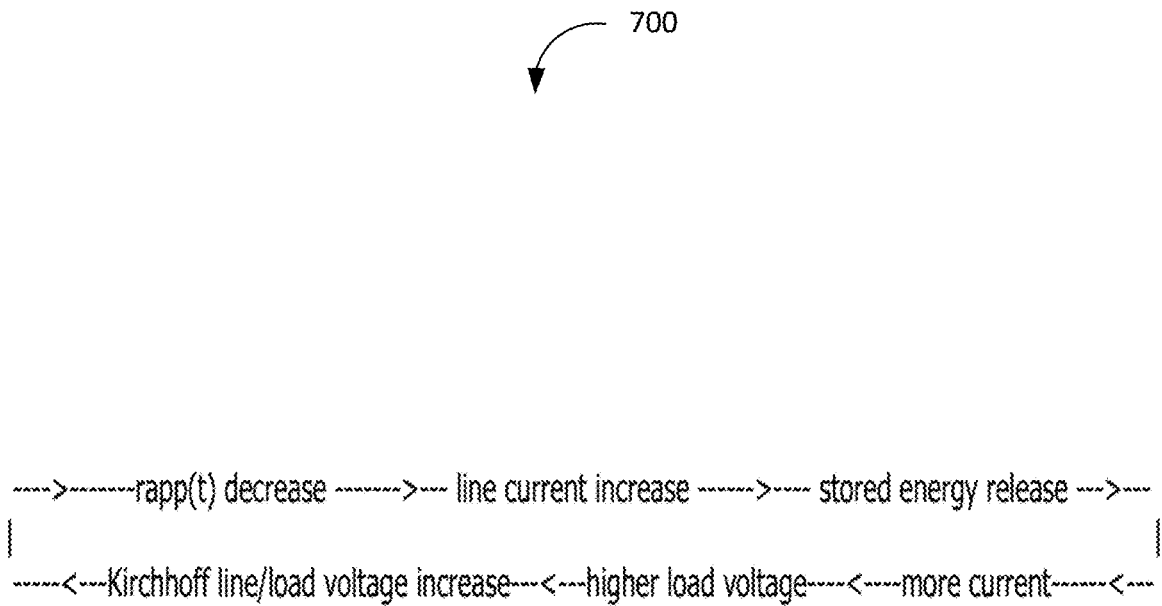
FIG. 7 illustrates a cycle 700 associated with the system, in accordance with some embodiments.

FIG. 7 illustrates a cycle 700 associated with the system, in accordance with some embodiments.

Figure 8:
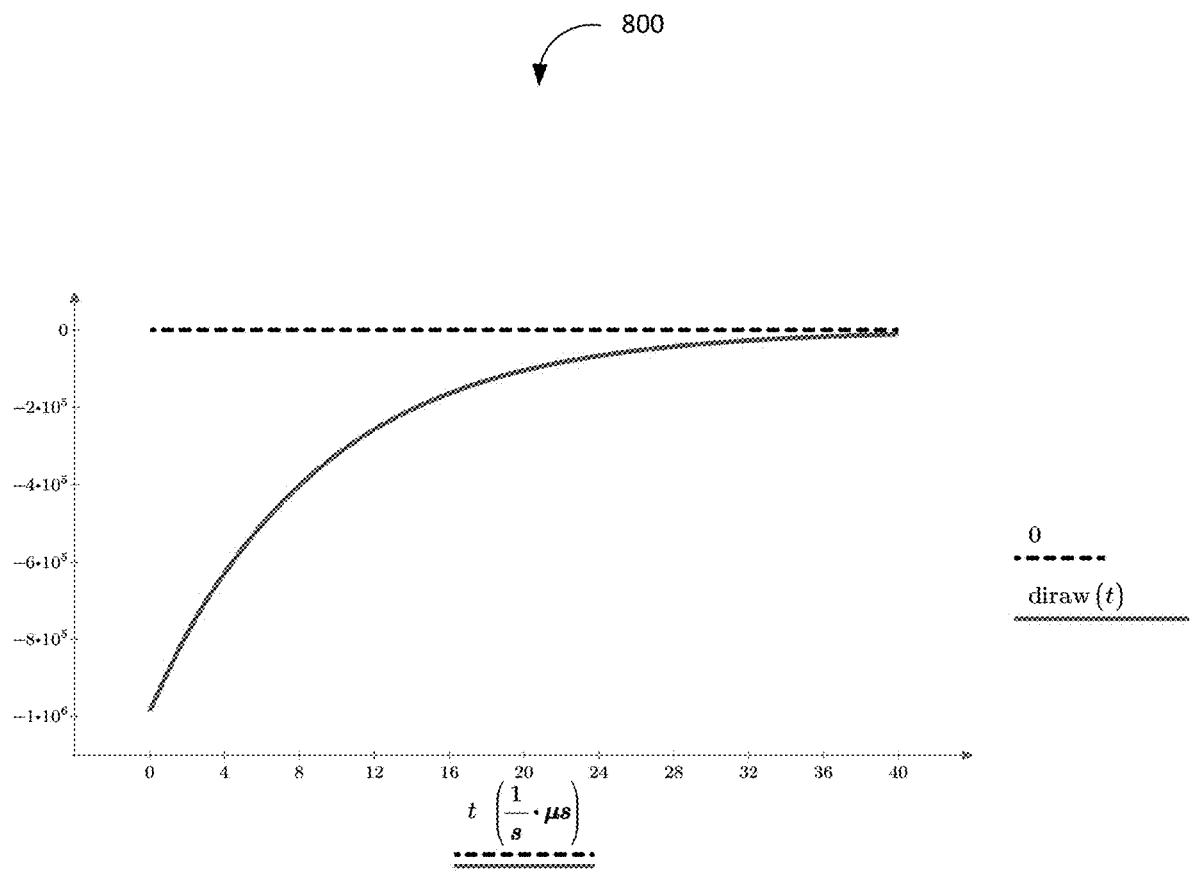
FIG. 8 illustrates a plot 800 associated with a line raw current rate of change associated with the system, in accordance with some embodiments.

FIG. 8 illustrates a plot 800 associated with a line raw current rate of change associated with the system, in accordance with some embodiments.

Figure 9:
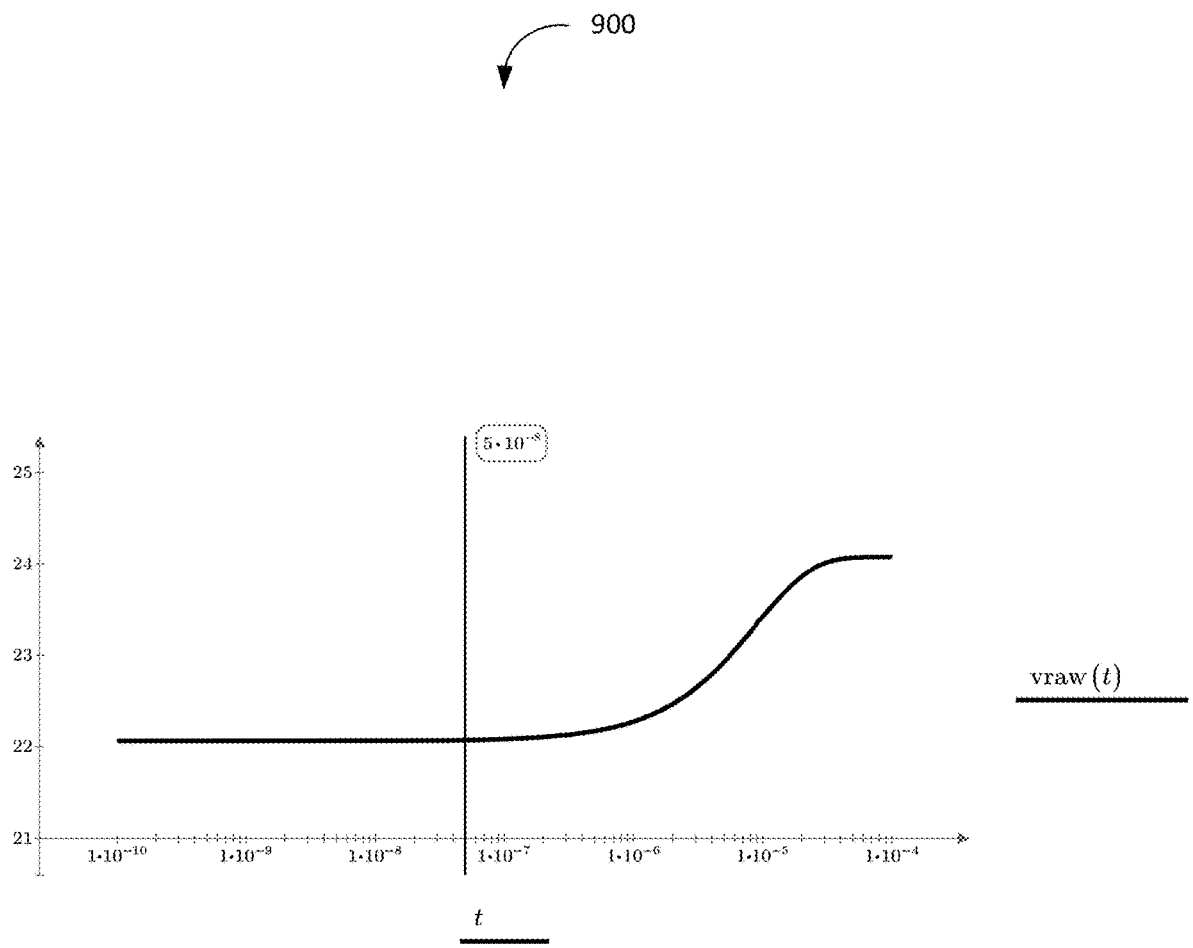
FIG. 9 illustrates a plot 900 associated with a power feed line input voltage associated with the system, in accordance with some embodiments.

FIG. 9 illustrates a plot 900 associated with a power feed line input voltage associated with the system, in accordance with some embodiments.

Figure 10:
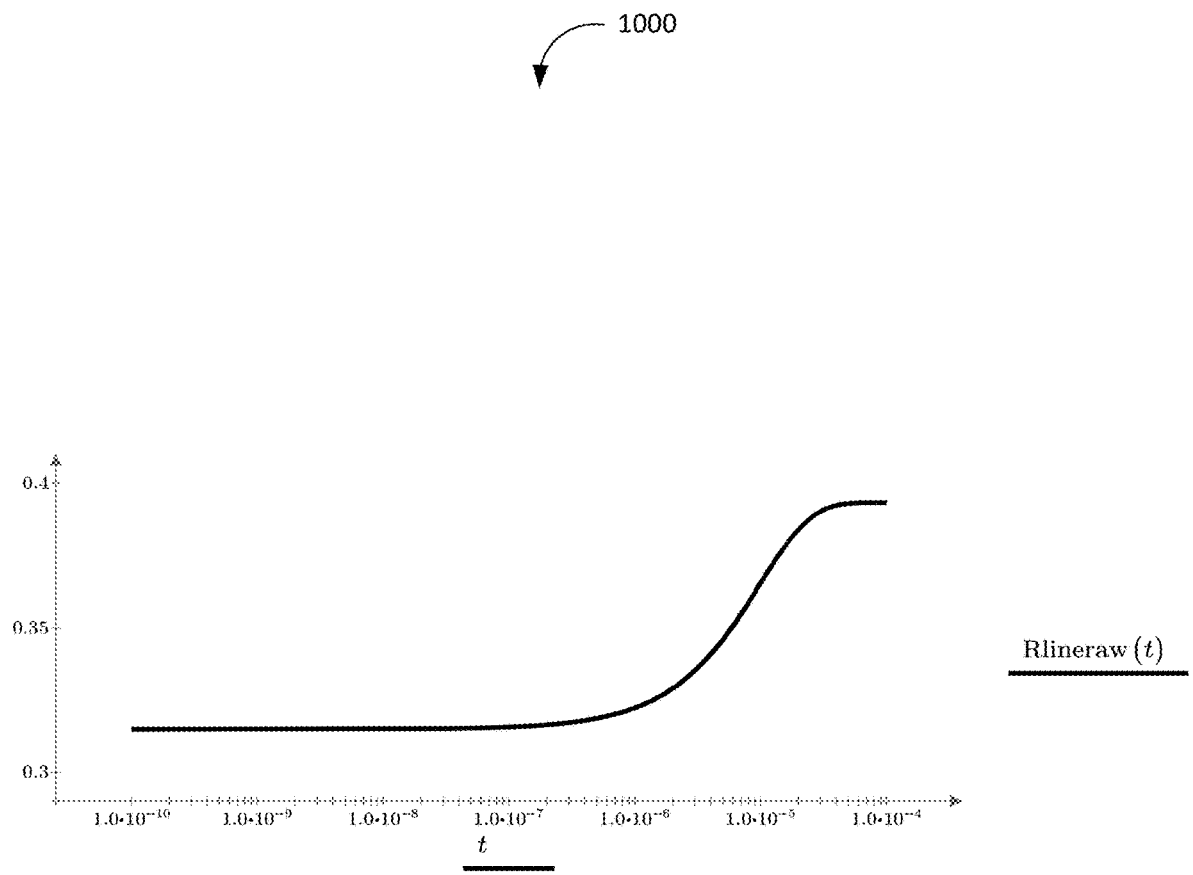
FIG. 10 illustrates a plot 1000 associated with a power line working input resistance associated with the system, in accordance with some embodiments.

FIG. 10 illustrates a plot 1000 associated with a power line working input resistance associated with the system, in accordance with some embodiments.

Figure 11:
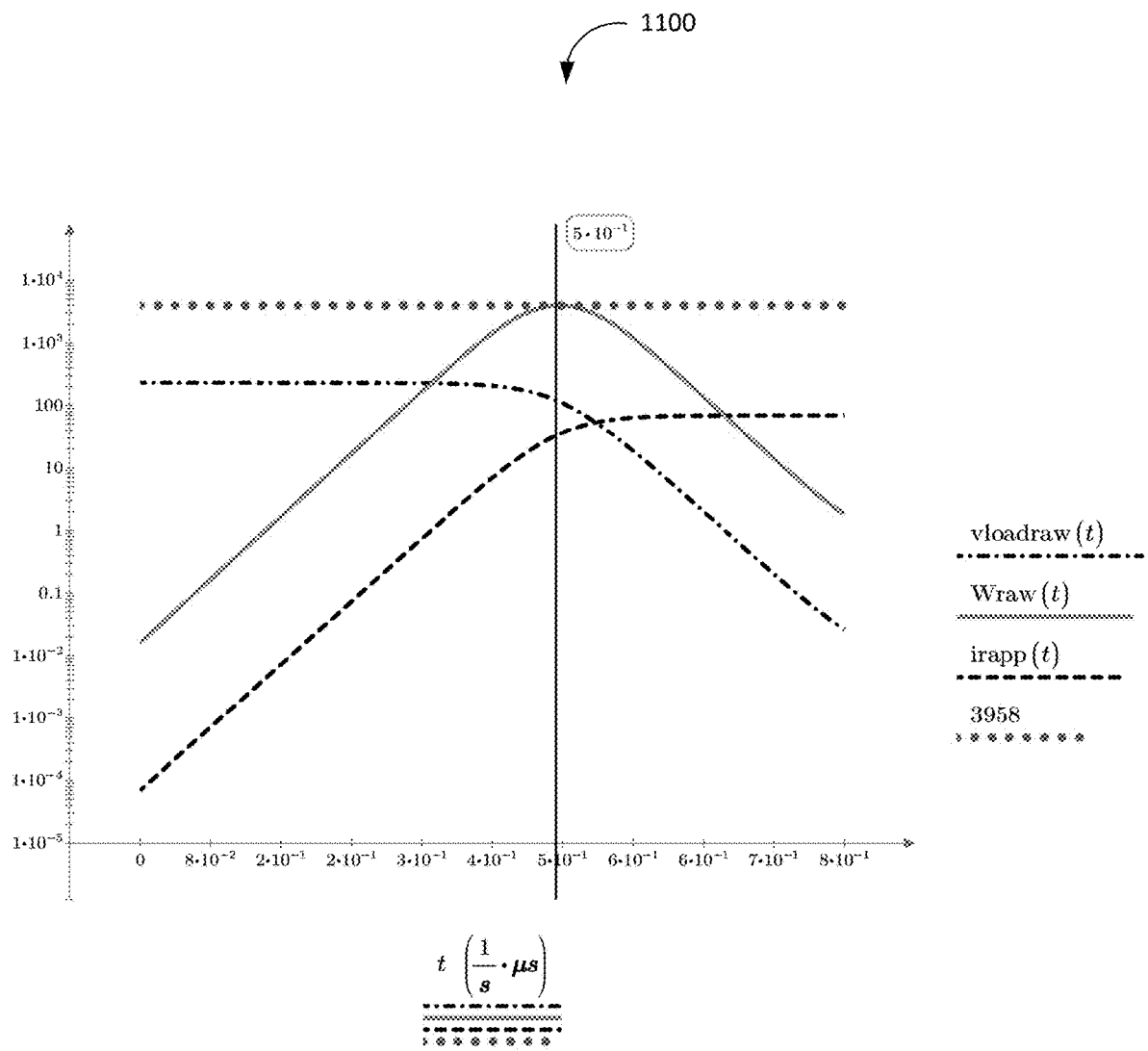
FIG. 11 illustrates a plot 1100 associated with a line fault response associated with the system, in accordance with some embodiments.

FIG. 11 illustrates a plot 1100 associated with a line fault response associated with the system, in accordance with some embodiments.

Figure 12:
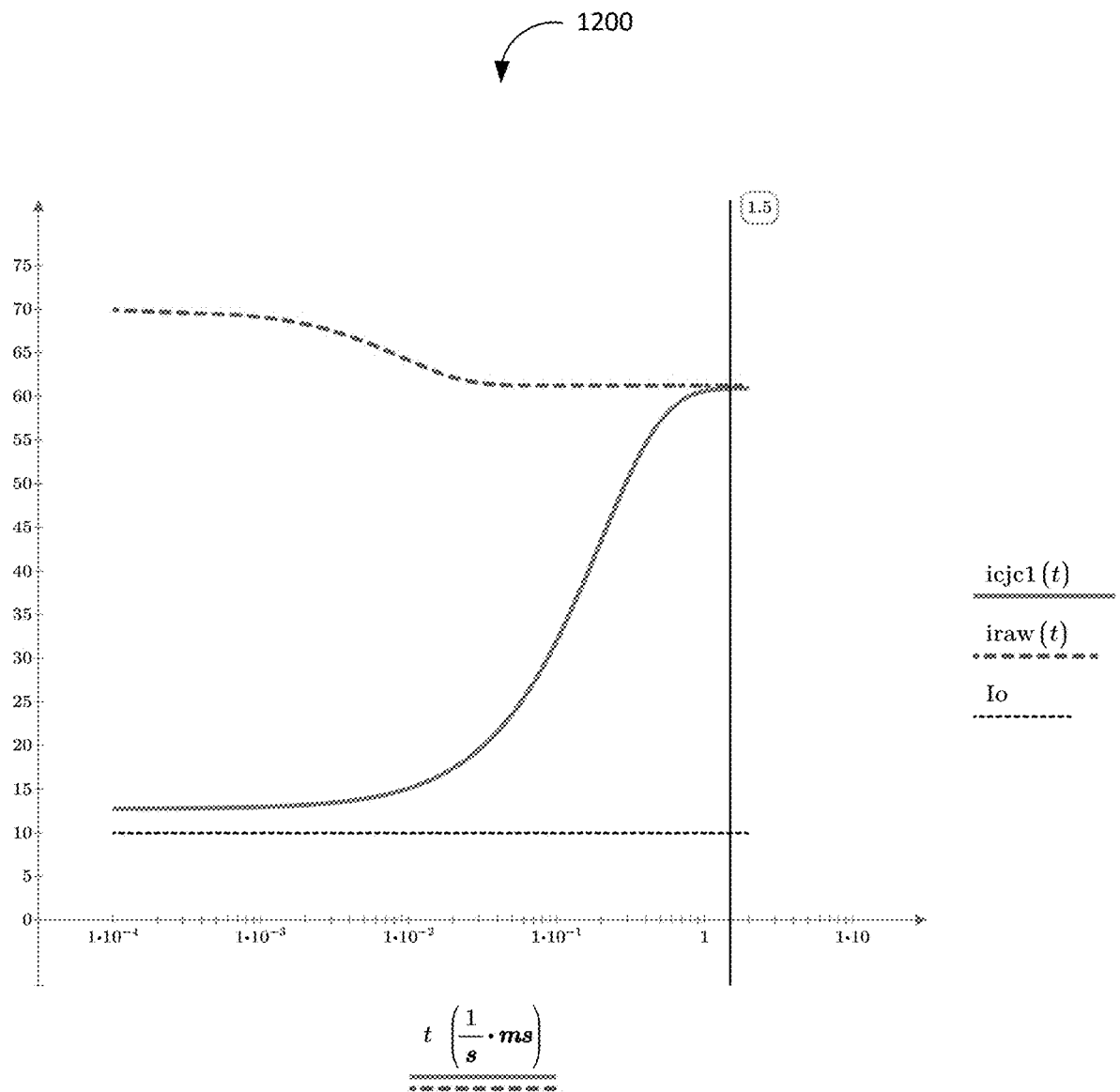
FIG. 12 illustrates a plot 1200 associated with a fault onset current jump control associated with the system, in accordance with some embodiments.

FIG. 12 illustrates a plot 1200 associated with a fault onset current jump control associated with the system, in accordance with some embodiments.

Figure 13:
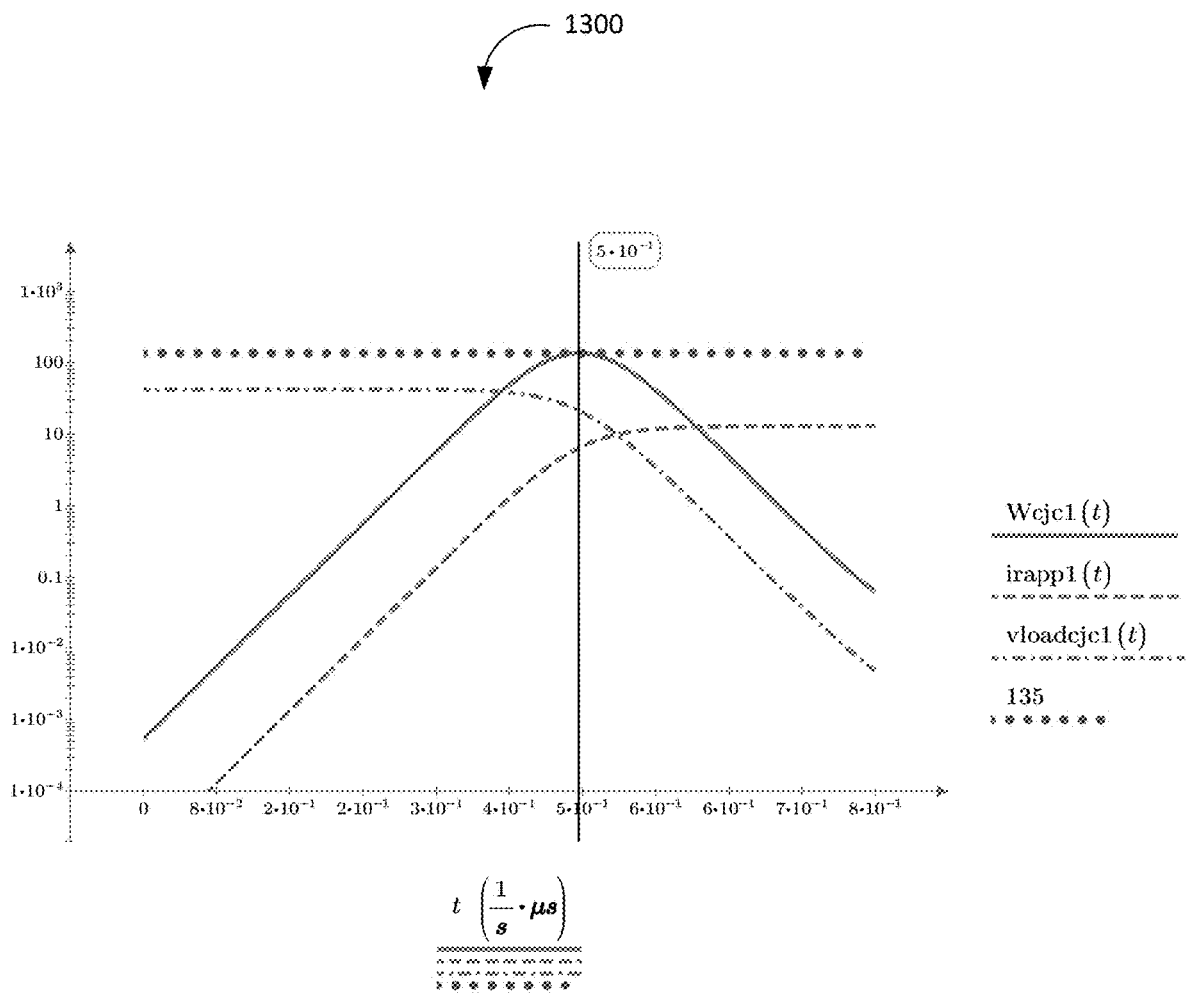
FIG. 13 illustrates a plot 1300 associated with a controlled fault response associated with the system, in accordance with some embodiments.

FIG. 13 illustrates a plot 1300 associated with a controlled fault response associated with the system, in accordance with some embodiments.

Figure 14:
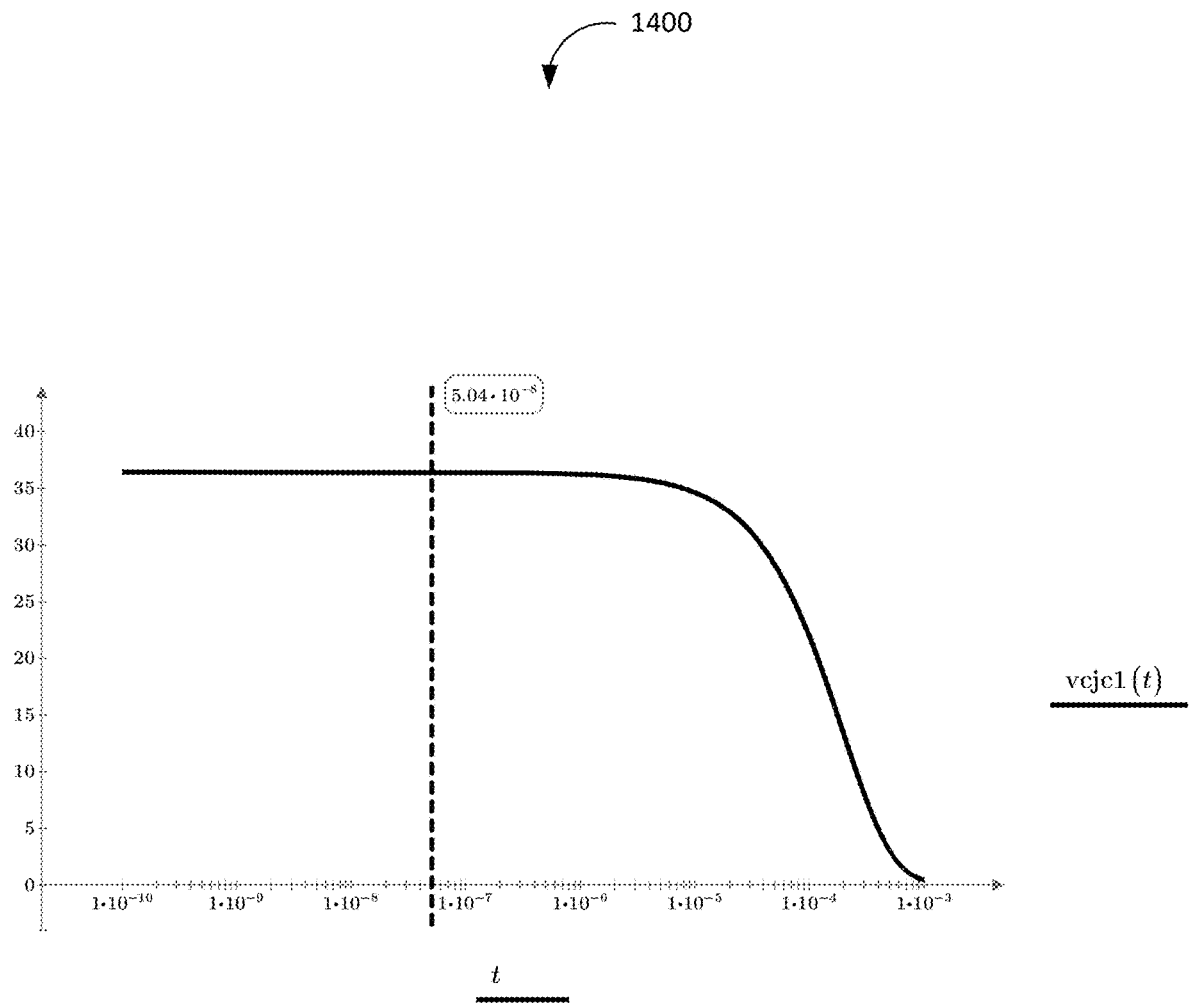
FIG. 14 illustrates a plot 1400 associated with a CJC component voltage associated with the system, in accordance with some embodiments.

FIG. 14 illustrates a plot 1400 associated with a CJC component voltage associated with the system, in accordance with some embodiments.

Figure 15:
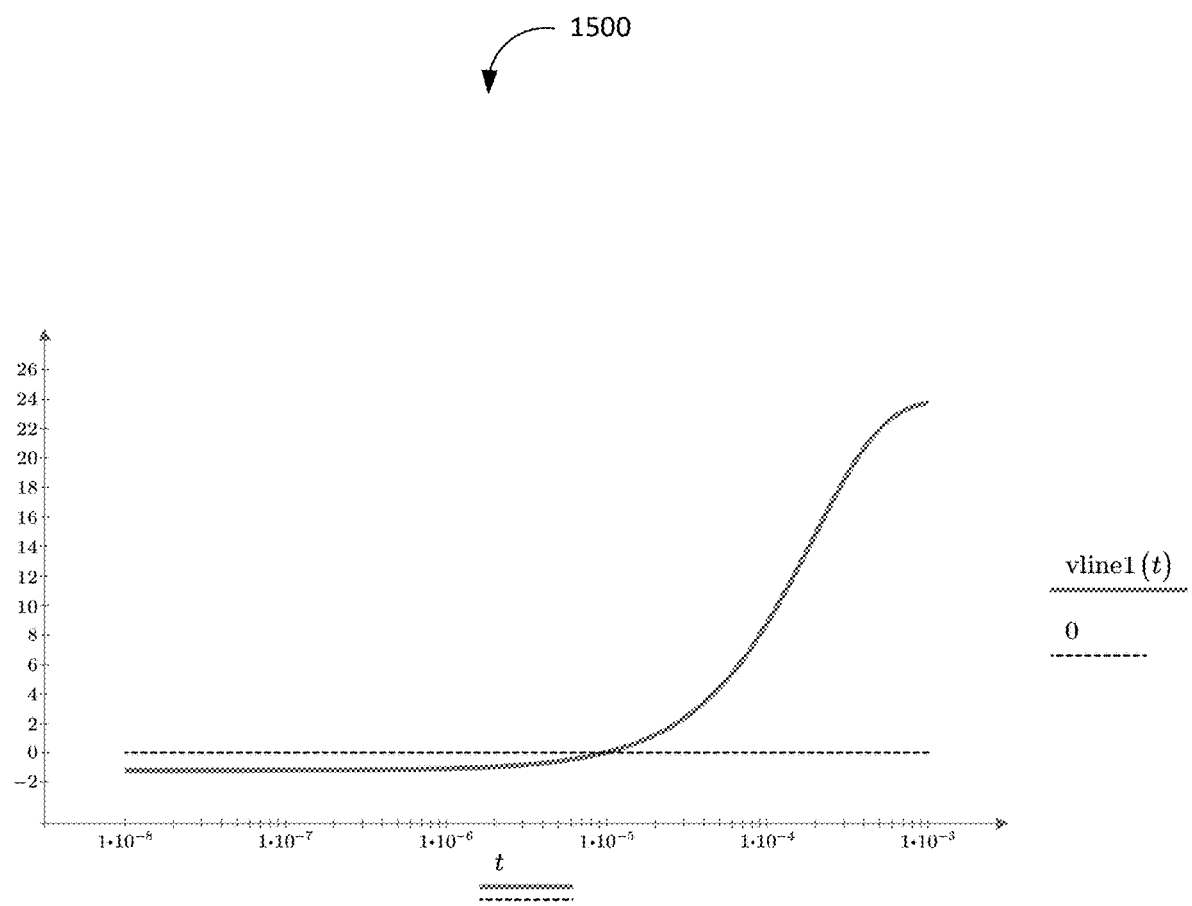
FIG. 15 illustrates a plot 1500 associated with a power feed line input voltage associated with the system, in accordance with some embodiments.

FIG. 15 illustrates a plot 1500 associated with a power feed line input voltage associated with the system, in accordance with some embodiments.

Figure 16:
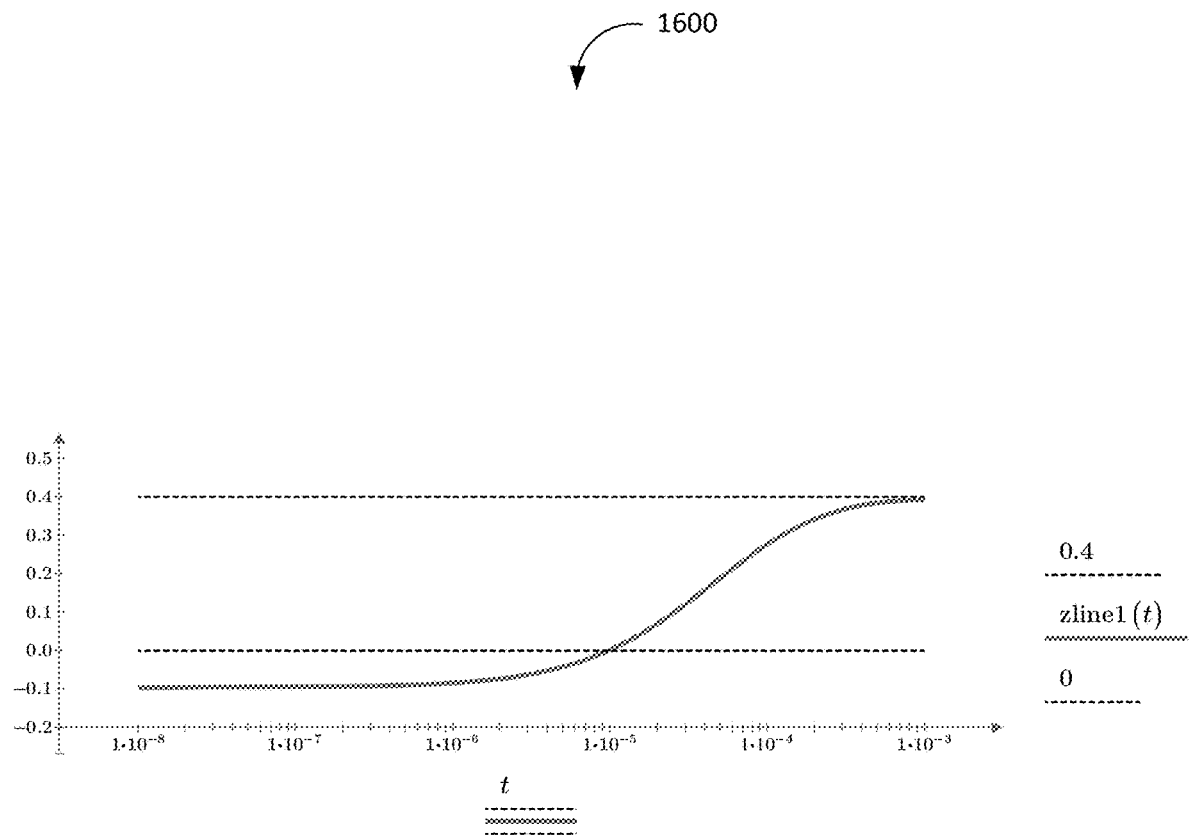
FIG. 16 illustrates a plot 1600 associated with a working power line input resistance with allowance for stored energy associated with the system, in accordance with some embodiments.

FIG. 16 illustrates a plot 1600 associated with a working power line input resistance with allowance for stored energy associated with the system, in accordance with some embodiments.

Figure 17:
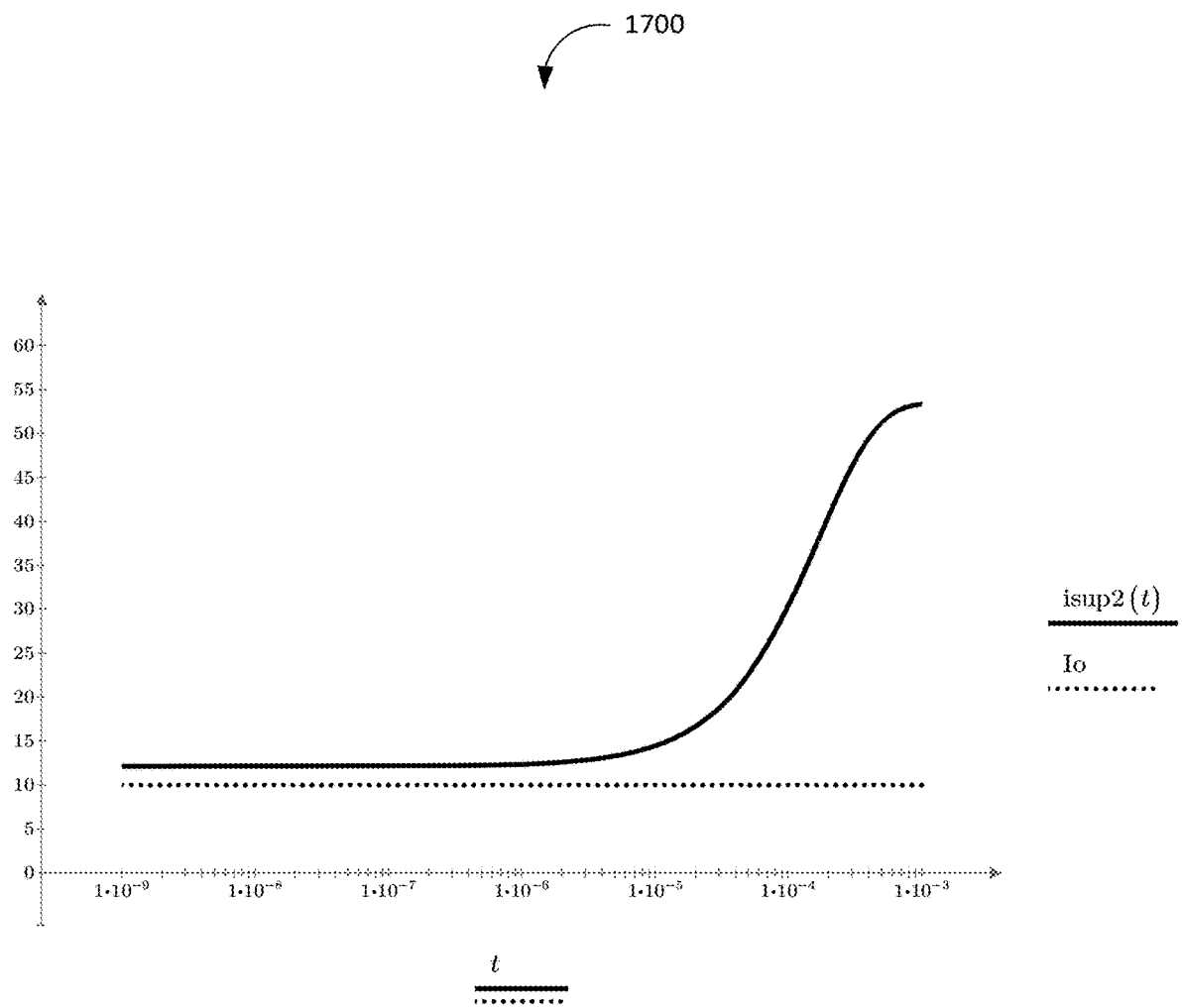
FIG. 17 illustrates a plot 1700 associated with a circuit associated with the system, in accordance with some embodiments.

FIG. 17 illustrates a plot 1700 associated with a circuit associated with the system, in accordance with some embodiments.

Figure 18:
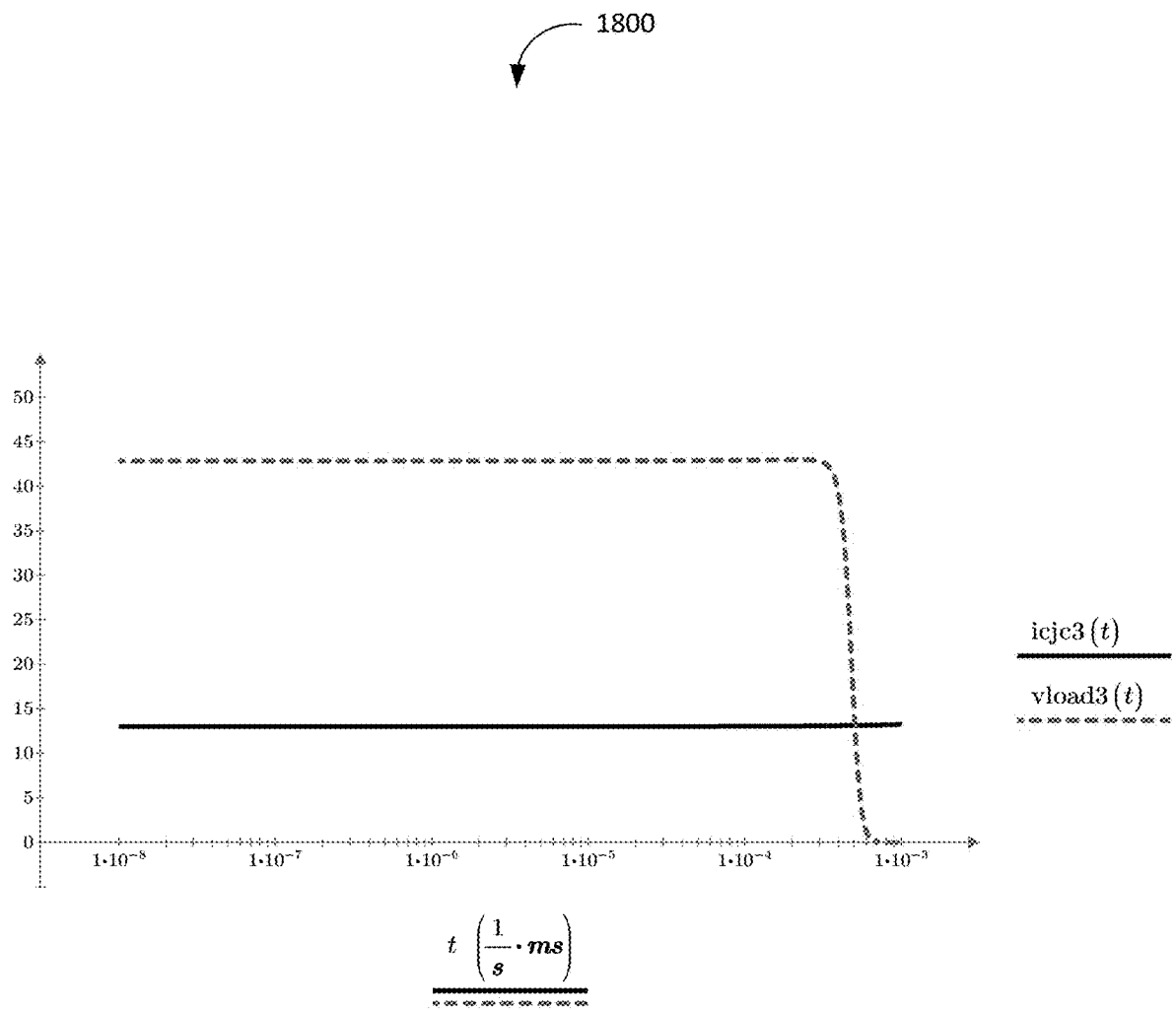
FIG. 18 illustrates a plot 1800 associated with a CJC coil circuit associated with the system, in accordance with some embodiments.

FIG. 18 illustrates a plot 1800 associated with a CJC coil circuit associated with the system, in accordance with some embodiments.

Figure 19:
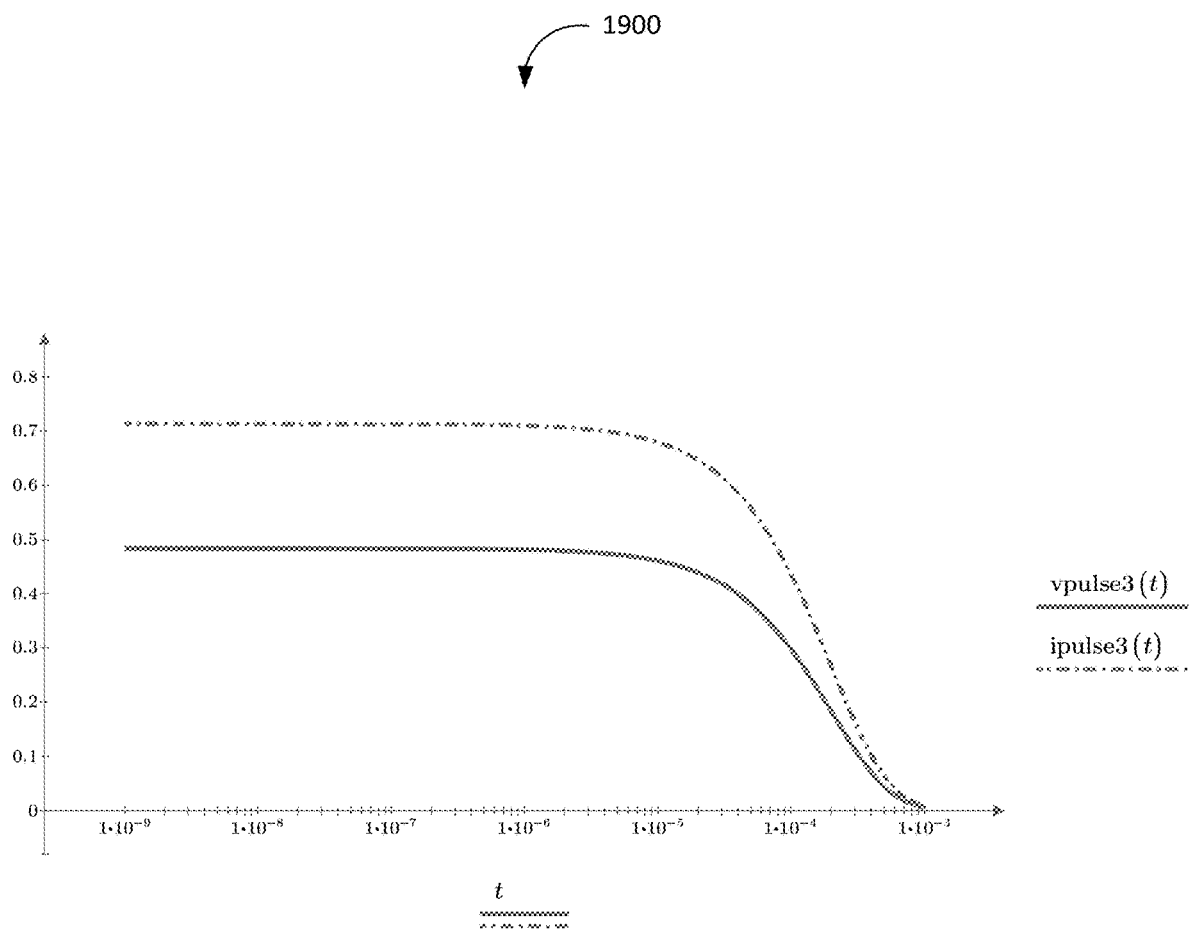
FIG. 19 illustrates a plot 1900 associated with a Lset coil action voltage and current associated with the system, in accordance with some embodiments.

FIG. 19 illustrates a plot 1900 associated with a Lset coil action voltage and current associated with the system, in accordance with some embodiments.

According to some embodiments, a device for facilitating controlling change in an impedance of a power supply circuit during a fault is disclosed.

Introduction and solution: Work began with a question about how to prevent the reported arcing and immediate jump to the allowable fault current that occurred when a working power feed line was severely faulted, without the use of an iron cored inductor. Arc suppression at fault onset should be addressed. Power system data and power line length were not given.

The fact that an experienced engineer, the writer and co-inventor of U.S. Pat. No. 7,126,445, October 2006, asked this question of a long retired colleague meant that a practical and useful solution for the fault effect on that project was not known.

Emphasized statements that follow show the reasoning and methodology of the fault problem solution, designed to be readily understandable to those with relevant experience and skill.

The problem was solved by adding a series circuit, with a minimal value of inductance, that reduced the current jump to a value close to the initial pre-fault value while controlling any fault onset arc energy for a chosen circuit. The basic cause of the immediate current jump was also explained.

A unique solution was designed, to reproduce the fault response, by using the fact that external energy is applied to the circuit by an approaching load fault process value with an initial value much greater than the load resistance. This generated a minuscule Heaviside step response, close to a zero initial fault current change; any tiny current change is much less than any of importance here. Different fault circuits will produce other results which could be tailored to model known data.

Calculation was started by using the fact that electrical circuits or components of any length are inductive, and currents cannot change in value immediately, but perhaps very quickly. Current flow is electron motion: electrons have mass: relevant Newton's laws of motion apply. All mechanical motion takes time.

Normal line leakage admittance was shown to be of no importance for this solution.

An example solution is shown here, with a ten ampere initial direct current load, that can protect line lengths ranging from below twenty-five to one hundred feet or more, with supply sources of about twenty-eight to above sixty volts. Obviously, design for other voltages and lines can be done.

All claims arise from this introduction and the following mathematical process and references.

Initial solution thoughts: A simple add-on circuit was needed that could model and explain the reported fault onset effects. If a large initial fault current flows almost immediately, a large local voltage must appear across the load resistance. How did it get there during a short-circuit process? Any Kirchhoff Law zero loop voltage sum change occurs because of timely current flow. An external source had to supply the resistive load faulting trigger action. This large load fault voltage appears across a loop circuit component. To achieve a Kirchhoff zero loop voltage sum balance, an opposing voltage, aiding the power supply, must appear across the length of the power line. This voltage must increase towards the load end, because of the fixed or reduced faulted power line supply voltage.

Information search and solution construction: A reading of published work on the general area of electrical arcing found good information about the opening of current carrying contacts, and little concerning contact closure or fault onset.

The transient solution of the standard first order time differential equations, defining transmission line properties, can be solved as a set of two second order partial differential equations using the complex variable, $s=\alpha+j\omega$; and a time to frequency Laplace transformation.

A solvable second order differential equation needs in-process values or other information for a useful solution. For this electrical fault solution an in process transient circuit state was chosen instead of the usual textbook choice; time zero was redefined, enabling the simplified solution shown here. Stored magnetic energy could not be released until line voltage changed.

An intuitive guess was a twenty eight volt powered system, but circuit data was not known. It seemed that the best effort would be to think of a system that could be designed to handle a power source in the general range of 28 volts or more and line lengths for a ship, aircraft, or land vehicle. Here we show an example that will function well over a range of supply powers and fault profiles.

The range of possible design requirements and likely misuse is enormous. A design methodology and an example are shown that uses a clean power supply voltage, but extra pre-filtering could be added to the effective power supply internal impedance.

While gathering ideas about a possible and practical, everyday, fault to demonstrate a solution method, a high fault energy power spike on an unprotected working power feed line load was found. The basic reason for this immediate supply power increase had to be understood.

The design process produced a new equation for the input impedance, $Zin(s)$, of a working and charged finite-length active power feed line, represented as a transmission line. The developed new equation is independent of the initial line direct current and is the foundation for the following work. It uses an in-process transient, zero current change, condition, and a common sense component simplification, that simplifies the results of the circuit calculations.

Attention to core size and shape can reduce the inductance variability of the finished product; basic core dimension details that can be seen in published Conformal Schwartz-Christoffel Transform (CSCT) design equations in other referenced papers. Here, a start is made by using relatively large air gaps and operating the ferrite core material in the below-the-knee region of its B-H curve where magnetic reluctance and its variability are relatively very small with respect to the flux air path values. Crudely, the core may be viewed as a relatively low reluctance value permeable wire that connects the high reluctance value flux air paths. The core window volume leakage path reluctance then generally smooths other value changes due to the variations of the window, core leg, and air gap sizes.

Basically, this disclosure is an attempt to explain the reported initial current jump and arcing problem by using a simple common sense mathematical and physical approach to produce an understandable design process. Known dots of published information are connected.

At the fault onset, the loop circuit impedance change should be minimized for low current change. Added direct current circuit components would be inductive/resistive to allow high current flow. A series inductance added to the circuit after the power source would collect some of any loop circuit voltage change as required by the Kirchhoff zero loop voltage summation law, and have initial stored energy.

A few microamps of line insulation resistive leakage current should have no direct practical effect on the value of line currents that are millions of times larger. Line leakage exists in the transmission line equations as an admittance, G1, but has no practical value here. With the line loss insulation admittance component, G1, set to zero, the transient solution of a faulted, finite-length, active charged transmission line can be greatly simplified. Apparent fast changes often need a spark action that allows a necessary circuit reaction time. Practical approaching electrical fault actions must start with a very small local initial approach current; an electrical air path breakdown arcing event is an obvious example.

Using these foundation ideas, the input impedance of a short faulted and charged finite-length transmission line was found assuming a zero load current change at the fault onset time: a transition state. This derived transient input impedance equation is used here as a series component in powered direct current loop circuits.

Line initial stored energy release must be handled.

The mathematical reason for the known almost instantaneous jump current increase in a faulted and unprotected loop powered circuit became surprisingly clear: mathematical fog vanished. A very small approaching fault current also allowed a peek at the (t=0- to 0) fault onset transition, avoiding large Heaviside step fault functions and allowing a view of the large initial increase in the faulted load voltage and very large fault spike power.

A component design example is shown that will reduce these undesirable effects and could protect more than one current sharing, or core magnetizing current, circuit. The component construction shown here is innovative. A gapped ferrite core assembly is used with a helpful shape that can use standard production parts. The magnetic reluctance of the core open window area is used to provide a very large increase in the initial calculated value of the main current carrying coil inductance, Lcoil, here to about +300%. This of course enables a lower coil resistive power loss when a large circuit fault current flows before circuit protection devices operate.

An example solution is shown that uses available ferrite parts; it is not necessarily the best possible result, but it functions for this circuit model and is a result of the design process.

Experienced engineers will know that all desired exact nominal values of inductance may not be mathematically possible. The final assembly is a collection of parts with mechanical tolerances.

A unit with a much smaller inductance and physical size may not respond well to user changes in power supply voltage or other connecting line length or load changes. The range of operational environment variation should be known. The inductance may be too small to function well.

Circuit design considerations: The obvious initial problem was a total lack of expected arcing information: rate of fault closure, local atmospheric data, geometry, such as sharp edges of the closing surfaces, and voltages. Users reported an instant fault onset arc. Arc current formation is a non-linear local event that takes some time, allowing circuit voltage reset.

A modeled circuit can show conditions before the fault happens. Fault closure non-linear resistance can be modeled to occupy a certain time; just a reasonable guess that does not include bouncing, metallic vapor, or particulate spray. The aim was to remove the need for modeling an unknown fault onset arc event. Other fault formats can be tried.

The problem solution was attacked aggressively by using a relatively large pre-fault direct current, producing initial line stored energy, on a short load feed line, to create a high energy practical fault problem; a mixture of Kirchhoff's laws, current momentum, and transmission line action. A cable of about this length might be found in an electric vehicle, a factory, or providing weapon release on an attack helicopter. The available fault short-circuit current is obviously dependent upon the powered system's static operating values and resistances. The chosen example power source was three small twelve volt AGM batteries; low voltage fault onset arcing was known to be a problem.

Chosen circuit component values were bounded by the desire for a practical and manufacturable component that could handle the expected range of initial fault onset supply current jump with available ferrite cores. Coil winding temperature rise occurring with a slow circuit protection response was also a consideration. The final example was fashioned to also produce a low impedance pulse, at fault onset, that could be used to activate a current limited shut-down device or for some other purpose, while the fault current increase was small.

Basically, the value of the input impedance of a powered and faulted loop circuit is set to a value to attempt to control any change in the value of the power supply current at the instant of a gradually decreasing approaching fault function resistance, with a small controlled value of inductance.

1. Define a fault function that emulates the reported action, in a simple circuit.
2. Insert a series loop component, the Current Jump Control, or CJC circuit.
3. Account for the effect of initial line stored energy.
4. Examine a range of fault resistance/time profiles to find a more violent fault action to avoid surprises.

An expression for the working charged and faulted, finite-length line input impedance is developed that is independent of the initial current value. This newly derived transient input impedance formula for the charged and faulted power feed line is used as a loop circuit component. The current change is initiated by the action of the applied fault in parallel with the load. The fault event could also happen along the line. Power supply data, perhaps with a pre-filter, must be known. A novel inductor design is shown, used in the following simple loop circuit, that uses a deliberate construction window flux path to greatly increase the CJC component inductance value. This of course reduces losses and costs.

Basically, a circuit diagram as shown in FIG. 3, is the only circuit diagram that is needed; simple equations will describe each unit. No more than one external ground connection that would interfere with the basic circuit operation can be used with this circuit diagram. The faulted load is connected to the power supply through the power feed line, modeled as a transmission line. Some lost load voltage is transferred to the CJC component, maintaining the net circuit zero loop voltage summation while adding loop circuit stored energy. The CJC component voltage and circuit stored energy are discharged as the supply current change increases.

The newly developed transient charged line input impedance formula can allow the easy chaining or paralleling of lines with different surge impedances, lengths, loads, or line segments joined at a fault. The fault onset effect on an unprotected line immediately causes the loop circuit to act as a virtual switch that lowers the faulted line input impedance from its pre-fault purely resistive value. The choice of initial current and load fault process at the fault onset is an in process user choice.

This simple but newly derived CJC component is not claimed to prevent a later short-circuit fault release electrical high energy arcing event or to provide EMP (electromagnetic pulse) protection. It may provide some fault onset EMI (electromagnetic interference) reduction. The immediate generation, at fault onset, of a clean and perhaps isolated and delayed voltage pulse could be used to effect circuit shutdown, control, or other action while the supply current increase is still small; also a possible future fault opening electrical arc warning.

Neither the CJC component impedance nor any of its component parts, necessarily need to match the load power feed line basic characteristic impedance, Zo(s). Their function is to control the loop power supply current change at the fault onset time.

Examples are shown after examination of the original unprotected line problem. Variation of a CJC component feeding fault control of a single line or three paralleled, supply current sharing, lines is demonstrated. Lines may have different lengths or surge impedance values. The number of parallel fed lines is a design choice. The core is, obviously, also magnetized by any added current carrying coil from any other unconnected circuit.

A direct current, inexpensive, low power source is deliberately chosen for the examples; fault onset arcs can occur in a variety of situations. Accurate control of the air gap and ferrite core dimensions could produce a very useful and manufacturable device with a small performance variation. This degree of control, and here the practical core physical shape, is usually not possible with a typical steel cored lamination construction.

Readable information on the understanding of the CSCT has long been available. Technical references and useful books are listed.

Note: Calculation and presentation of this disclosure used PTC Mathcad Prime 10 software Mathematical Analysis and Dynamic Charged Line Input Impedance: This example is a relatively low frequency exercise and basic Transverse Electromagnetic Field, (TEM), standard textbook time equations are shown for a transmission line. They cover both transient and quiescent conditions and can include resistive high frequency skin effects.

$$L1 * \left(\frac{\partial}{\partial x} i(x, t)\right) + R1 * i(x, t) = -\left(\frac{\partial}{\partial x} e(x, t)\right)$$

$$C1 * \left(\frac{\partial}{\partial x} e(x, t)\right) + G1 * e(x, t) = -\left(\frac{\partial}{\partial x} i(x, t)\right)$$

Real time values, t>=0. The supplied current or voltage can be steady or changing. With a steady state initial DC current, all line capacitance and inductance is charged before any changes occur. Calculated values exist only on the line.

Converting to the complex variable form and solving produced the following used equations, $(s*C1 + G1)*E(x, s) =$ $\quad -\left(\frac{\partial}{\partial x} I(x, s)\right) + C1*e(x, 0)$ Time and frequency voltage terms.

$\frac{\partial^2}{\partial x^2} I(x, s) - n(s)^2 * I(x, s) =$ $\quad C1*\left(\frac{\partial}{\partial x} e(x, 0)\right) - L1*(G1 + S*C1)*i(x, 0)$ Line current.

$n(s) = \sqrt{(R1 + s*L1)*(G1 + s*C1)}$ Line transmission constant.

$I(x, s) =$ $\quad Ic(x, s) + Ip(x, s)$ Complimentary plus Particular or Forced solutions.

The properties of the external circuit and any excitation form are not specified. The hand sides of equations 3, and 4, must have a construction that relates the equation time and complex values to produce useful Particular solutions.

Partial differential equations, such as equation 4, without in-process information or other boundary values, are not usefully solvable. A chosen Particular function solution may have several components, each of which must be a solution of equation 4.

At t=(0-) before the fault onset, the direct current static loaded line circuit is resistive, and stored magnetic energy is not active. A simple expression for characteristic impedance may be used for initial DC voltage values if the current does not change, practically, at the fault onset. Superposition will handle later line current changes.

A simple effect is needed to produce practical real time solutions because of the mixture of both time and complex values. In these disclosure examples, action is started by the circuit response to an approaching fault function that is in parallel with the load impedance. The initial very small value of the additive approaching fault current produces a normal, but very small, Kirchhoff voltage law response; close to a zero current initial change. Line circuit per meter reactances are ignored to allow the line initial or onset, dc input values, e(x, 0), i(x, 0) to define the fault onset resistive functions.

The value of the line insulation loss admittance per meter, G1, can be used to set the nominal load resistance value; after this, its effect on the working current is generally not important.

The Particular form, Ip(x, s), can be the simplest expression that sensibly solves equations 3 and 4. The Complimentary or homogeneous equation, Ic(x, s)=0, has two exponential solutions with circuit dependent multipliers.

A G1 value of zero is acceptable for these design examples and possibly many others, simplifying the calculations for the power feed line excitation. Lines with more length or leakage current are easily examined. Normal G1 values are very small. If, for some reason, the value of G1 is considered to be important, its absence might be included by a very small change in the value of the line per/meter resistance, R1, that restores the calculated value of Rload that used G1.

The search for a practical insulation leakage resistance value for a low cost power line produced an old standard for maximum leakage test resistance of an unloaded PVC insulated cable, of 100 MOhms per 1000 ft at 1000V dc. The maximum supplied test leakage current was 10 µA.

Using the basic textbook equations for a low frequency TEM line with finite length, D, and a simple non transient applied voltage:

$$Z_0(s) = \sqrt{\frac{R1 + s*L1}{G1 + s*C1}}$$

Line characteristic impedance. Bsic uncharged line input impedance, based upon reflections is:

$$Z_{in}(s) = Z_0(s) * \frac{Z_{Load}(s) + Z_0(s) * \tanh(D*n(s))}{Z_0(s) + Z_{Load}(s) * \tanh(D*n(s))}$$

$D_{11} := 1000 * 2 * 0.0254; R_{Load} := 10^{300}; R_1 := 0.036; D_1 := 7.62; R_{Contact} := 0.0045$ $R_{in} :=$ $$\frac{(R_{Load} + 2*R_{Contact}) + \sqrt{\frac{R1}{G1}} * \tanh(D11*\sqrt{R1*G1})}{\sqrt{\frac{R1}{G1}} + (R_{Load} + 2*R_{Contact}) * \tanh(D11*\sqrt{R1*G1})} * \sqrt{\frac{R1}{G1}} = 10^8 \xrightarrow[float,6]{solve,G1} 0.328084*10^{-10}$$

$G_1 := 0.328084 * 10^{-10} \frac{s}{m}$

Solving this last Zin(s) equation for line leakage admittance, G1, to produce Rin=100 MΩ with a 1000 volts direct current source for the D11 value of 1000 ft of cable material with zero reactance values used 16 gauge copper wire and R1 ohms per meter. RLoad is basically an open circuit.

Steady state leakage current is less than 0.3 µA for this 25 feet long circuit model at 1 Kv. Obviously longer lines and smaller supply voltages can be used.

Basic power line data: Line data was measured on the two power lines of a light duty, inexpensive, outdoor grade, 16 AWG equivalent, 125 v ac, 13 A rated, three wire cable, length 25 feet. Measured line values were:

Total loop inductance=4.88 µH
Line1=30.81 µH
Line2=30.94 µH
Total capacitance=521 pF
Total loop resistance=0.275 Ω
Data produced the standard per meter line values for 25 feet long cable.

$L_1 := 0.640 * 10^{-6} \frac{H}{m}; C_1 := 68.37 * 10^{-12} \frac{F}{m};$ $R_1 := 0.036 \frac{\Omega}{m}; \sqrt{\frac{L_1}{C_1}} * \Omega := 96.8\Omega$ $G_1 \xrightarrow{float,4} 0.3281 * 10^{-10} \frac{s}{m}; D_1 := 7.62$ m;

$D * \sqrt{L_1 * C_1} * s := (5.0 * 10^{-8})s$; For 50 nanoseconds.

Battery power source and load resistance: Batteries were three series 12 volt, 4.5 AH, AGM, (80 CCA, @ 7.2V) units: (Cold Cranking Amps.) Terminal voltage was set as 12.7 volts. Rsup=3*(12.7−7.2)/80=0.206, power supply resistance. The stated CCA current, 80 A, was larger than the calculated circuit peak fault current. A circuit breaker resistance of 0.014Ω is included. Static direct initial operating current is Io=10 A. There is a contact at each end of each line conductor. Rcontact=0.0045Ω a MIL-STD value. Rload can now be calculated, $E_{sup} := 38.1; R_{sup} := 0.206; I_0 := 10; R_{Contact} := 0.0045$ $E_0 := (E_{sup} - I_0(R_{sup} + R_{cb} + 2*R_{contact})) \rightarrow$ 35.81 Available feed line voltage. $I_0$ has all currents.

-continued $$E_0 - I_0 * \sqrt{\frac{R1}{G1}} * \left( \frac{R_{load} + 2*R_{contact} + \sqrt{\frac{R1}{G1}} * \tanh(D*\sqrt{R1*G1})}{(R_{load} + 2*R_{contact}) * \tanh(D*\sqrt{R1*G1}) + \sqrt{\frac{R1}{G1}}} \right) =$$

$0 \xrightarrow[float,4]{solve,rload} 3.298$ $R_{load} := 3.298$ Ω; $I_0 * R_{load} * V \rightarrow 32.98 * V$ $\frac{27}{8} \xrightarrow{float,4} 3.375$ Eight paralleled 27 Ω, 100-watt, 5% tolerance, resistors formed the circuit load.

We now use the simplified forcing function of equation 4, with G1=0, to ease a Particular current solution. If the charged line current is held equal to the initial steady value at the fault onset time, i(x, 0), will not change. This provides transition initial values. Summing the fault onset voltage upward through Rload with no change of current, we find a simple practical Particular solution of current in equation 4, by substituting simplified forcing function components.

$e(x, 0) = I_0 * (R_1 * (D - x) + 2*R_{contact} + R_{load}); \frac{\partial}{\partial x} e(x, 0) = -I_0 * R_1$ $G_1 := 0; i(x, 0) = I_0$ $n(s) := \sqrt{s*C_1*(R_1 + s*L_1)}; e(D, 0) = I_0(2*R_{Contact} + R_{Load})$ $\frac{\partial^2}{\partial x^2} I(x, s) - n(s)^2 * I(x, s) = C_1 * \frac{\partial}{\partial x} e(x, 0) - L_1 * (s*C_1) * i(x, 0)$ $\frac{\partial^2}{\partial x^2} I_p(x, s) - n(s)^2 * I_p(x, s) = -I_0 * C_1 * (R_1 + s*L_1) = -I_0 * \frac{n(s)^2}{s}$ $I_p(x, s) = \frac{I_0}{s}; \frac{\partial}{\partial x}(I_p(x, s)) = 0; \frac{\partial^2}{\partial x^2} I_c(x, s) - n(s)^2 * I_c(x, s) = 0$ By definition, the natural or complimentary unforced response. $I_c(x,s)=A(s)* \exp(x.n(s))+B(s)*\exp(-x*n(s))=0$ Independent exponential solutions with a non-zero Wronskian.

A(s) and B(s) are not functions of line distance, x, and their values are set by the circuit values. At the line input, for Zin(s), B(s)=−A(s) at x=0, leading to an easy solution of Zin(s) as the exponential components are never equal to zero, and leaving one unknown multiplier. This term must now provide all the circuit component data needed for a useful solution. Ic(x, s) is now simplified.

$$I_c(x, s) = 2*A(s)*\sinh(x*n(s)) = 0$$

$$I(x, s) = 2*A(s)*\sinh(x*n(s)) + \frac{I_0}{s}$$

A final very simple solution form for the charged, faulted, transmission line current equation. With zero leakage, all direct current goes to the load.

$$\frac{\left(2.A(s)*\sinh(D.n(s)) + \frac{I_0}{s}\right)*(Z_{load}(s) + 2*R_{contact})}{\frac{-2*n(s)*A(s)*\cosh(D*n(s))}{s*C_1} + \frac{I_0*(R_{load}+2*R_{contact})}{s}} = 1$$

We can now describe the load end fault onset voltage, E(D,s), in two ways to evaluate A(s) using simplified equations 3,4.

This equation describes an event with zero initial fault onset load current change. The virtually switched load impedance has changed from Rload to Zload(s), but the practical line current cannot change instantly. A(s) will be true on either side of the fault transition.

$$A(s) = \frac{-Z_{load}(s) + R_{load})*C_1*I_0}{2*s*C_1*(Z_{load}(s)+2*R_{contact})*\sinh(D*n(s)) + 2*n(s)*\cosh(D*n(s))}$$

The working fault onset, transient changed line input impedance is:

$$Z_{in}(s) = \frac{E(0,s)}{I(0,s)} = \frac{\frac{-2*n(s)*A(s)}{s*C_1} + \frac{I_0}{s}*((R_{load}+2*R_{contact}+D*R_1)}{\frac{I_0}{s}}$$

$$Z_{in}(s) = \frac{(Z_{load}(s)-R_{load})}{\frac{C_1*s}{n(s)}*(Z_{load}(s)+2*R_{contact})\sinh(D*n(s))+\cosh(D*n(s))} +$$

$$R_{load}+2*R_{contact}+D*R_1|Z_{load}(s)|<R_{load}$$

$z_{load}(s)$ is a changing parallel sum of load and fault action.

This newly derived transient input impedance equation is true for any initial DC supply current, and clearly separates the static and frequency dependent components. It provides a clear preview of the fault onset line input impedance change that triggers the resultant net loop circuit response. The net circuit response is a combination of transmission line action and the continuous Kirchhoff voltage law requirement, via superposition, of a zero loop circuit voltage summation as the line responds. The cause of the automatic virtual switch action is clearly seen.

Basic Circuit Unit Definitions: Values Shown Later $$Z_{coil}(s) = \left(\frac{1}{R_{coil}+s*L_{coil}} + s*C_{coil} + \frac{1}{R_{damp}} + \frac{1}{R_{loss}}\right)^{-1}$$

$$Z_{damp}(s) = R_{damp} + \left(\frac{1}{R_{Q3}} + \frac{1}{R_{set}+s*L_{set}}\right)$$

$$Z_{cjc}(s) = \left(\frac{1}{Z_{coil}(s)} + \frac{1}{R_{damp}(s)}\right)^{-1}$$

$$Z_{load}(t) = \frac{R_{load}*r_{app}(t)}{R_{load}+r_{app}(t)}$$

$$Z_{in}(s) = \frac{(Z_{load}(s)-R_{load})}{\frac{C_1*s}{n(s)}*(Z_{load}(s)+2*R_{contact})\sinh(D*n(s))+\cosh(D*n(s))} +$$

$$R_{load}+2*R_{contact}+D*R_1$$

Supply current with the CJC component impedance and all stored magnetic energy.

$$I_{sup}(s) = \frac{\frac{E_{sup}}{s}+I_0*(D*L_1+L_{coil})}{R_{sup}+R_{cb}+2*R_{contact}+Z_{cjc}(s)+Z_{in}(s)}$$

Loop excitation at t=(0−) and loop impedance at t=(0).

The circuit external to the line sets the value of the fault onset current. Any loop initial excitation opposing capacitive voltage is set by the line resistive network that feeds the model capacitance and is implicit in the calculations. The line inductance has a direct and simple connection between the power source and the load and its stored energy is not active until the circuit voltage starts to change.

The use of a practically zero initial line fault onset current change was not arbitrary; electrons have mass and Newton's laws of motion apply; currents existing in inductive lines need time to change in value. The stored magnetic energy provides an immediately available extra initial impulse of current, with a shape dependent upon the fault profile.

This whole process has shown an innovative and practical and simple way to usefully solve the faulted and powered transmission line second order partial differential equations.

The basic line fault current response, with initial energy: Initial stored energy exists along the length of the line. For a simple powered, series connected (L+C+R) circuit that has initial component charge, the general loop equation is, $$L*\left(\frac{d}{dt}i(t)\right)+R*i(t)+\frac{1}{c}*\int_0^1 i(t)dt = e(t)$$

$$I(s) = \frac{V(s)+L*i(0)-\frac{V_c(0)}{s}}{s*L+R+\frac{1}{s*C}} = \frac{\text{Excitation}}{Z_{cct}(s)}$$

Where i(0) is the inductor current at some time, and Vc(0) is the pre-fault capacitor voltage. It will be shown later that the effective opposing capacitor voltage effect here is zero.

$$I_{raw}(s) = \frac{\frac{E_{sup}}{s} + I_0 * D * L_1}{R_{sup} + R_{cb} + 2 * R_{contact} + Z_{in}(s)}$$

There is a simple circuit zero at:

$$s = \frac{-E_{sup}}{I_0 * D * L_1} \xrightarrow{float,4} s = -0.7813 * 10^6 \text{ Obvious added pole at } s = 0.$$

which accounts for the immediate current jump seen. Kirchhoffs Law net loop circuit zero voltage summation, via current change, will happen very quickly; probably with an (unmodelled) arc duration that allows necessary circuit adjustment time. This simple circuit equation clearly shows the reasons for the reported circuit fault reaction. The apparent and necessary reduction of the faulted line input impedance is not obvious.

Fault model: An actual short-circuit or fault event is unlikely to be a total instantaneous physical Heaviside step impedance function or finally a zero resistance. An approaching load fault impedance change may produce an initial small increase in the local load current. Any fast approaching net load reduction event may also involve some almost adiabatic local air compression and heating, adding to a small and changing approaching fault load current. A hammer blow or an approaching cannon shell are examples.

Arcing can happen at low voltages and small distances if a fault condition is just right. The following example approaching fault function was adjusted to reproduce the reported large reaction for this low voltage and short distance example. It could be set to simulate other or known data.

An accepted breakdown voltage value for air is about 30 kV/cm, or about 70V/mil. Water vapor, air pressure, or sharp objects in the approach area can reduce this number.

A one size fits all approach was needed to tackle this problem. Without special knowledge, we can only find an approaching load fault/time function that produces a violent action or that may be similar to what has been reported; it will obviously be circuit and environment dependent. Knowing that circuit currents cannot change immediately led to the use of a mathematically supportive approaching fault event with a very low initial step current that is much less then any value of concern here.

Here we use a simple mathematically describable fault function to drive the system example, with a one microsecond period, for this short line. One mil per microsecond is close to 57 mph, a slow fault, human scale, action time that also avoids a large Heaviside step function by using a very large initial fault resistance approach value that closely matches a zero initial fault current change.

We start with 10 µA initial small approaching fault current and finish with 100 ρΩ faulted resistance. The approaching fault function is defined by a simple expression that enables easy modification of its start and finish resistances and duration. It could also be repetitive or a series of different faults.

If the reader is concerned about the power source, the environment or just damaging 20 mm cannon shells traveling very fast, then the outlined process allows the practical circuit, and fault and power supply values to be adjusted. Known data could be modeled.

This disclosure shows a practical realization and solution of a very old problem that is typically avoided in textbooks: a severely load-faulted, powered, finite-length line. The forcing functions of the shown Laplace current and voltage solutions contain variables of different types which must be sensibly related to produce solutions. A fault function with a very small initial resistive effect allows a calculation that uses a practical in process zero initial current change. Onset arcing action is ignored: it does not occur immediately.

$b := 10^6 * R_{load}$  10 µA initial 10 A current load addition by the approaching fault function, $r_{app}(t)$.

$r_{app}(t) := b * \exp(-t * 29000000) + 0.0001;$ $$r_{app}(10^{-6}) * \Omega \xrightarrow{float,4} 0.0001008 * \Omega; 100\mu\Omega \text{ 1 } \mu s.$$

$$Z_{load}(t) := \frac{R_{load} * r_{app}(t)}{R_{load} + r_{app}(t)}$$

$$Z_{load}(0) \xrightarrow{float,6} 3.298$$

This fault resistance reduction is initiated by an external unknown force. However, the chosen resistance profile is all that is needed; forced circuit response values control the action. The small Heaviside step initial value produces an initial fault onset current much smaller than any of interest here. The aim is simple and understandable calculations.

The fault is the trigger, the power supply is needed for energy. The fault function profile used here was adjusted to find a very large current initial response to control for this simple loop circuit example, avoiding later in-use surprises.

On the basis of Fault Profile, a plot 400, as shown in FIG. 4, and a Net load resistance, a plot 500, as shown in FIG. 5, $$R_{app}(s) := r_{app}(t) \xrightarrow{laplace,t} \frac{3298000.0001 * s + 2900}{s^2 + 29000000.0 * s}$$

Faulted and Unprotected power line: a view of the original supply current jump problem:

$$I_{raw}(s) = \frac{\frac{E_{sup}}{s} + I_0 * D * L_1}{R_{sup} + R_{cb} + 2 * R_{contact} + Z_{in}(s)}$$

The distributed line inductive stored energy releases an initial added impulse of current of about 8.8 A.

iraw($t$)=81.24·exp(−0.0001796·$t$)+8.797·exp(−0.1121·10$^6$·$t$)+9.995iraw(0)=70.0iraw(0.001)
=61.2

The plot 600, as shown in FIG. 6, shows an immediate supply current jump. Arcing action could provide time for unseen and unmodelled circuit reset action.

The changing fault value, rapp(t), is triggered by an unspecified external power source, but that data is not really necessary as its defined resistive value feeds all action. The goal here is to fashion an understandable fault response that agrees with reported circuit action by using a simple loop circuit model free of mathematical fog.

At fault onset the line apparent input resistance must have decreased, allowing a very fast line current jump, including the line stored energy effect. Kirchhoff's zero sum loop voltage law, continually adds a countering voltage along the line when current change begins. There is a large, possibly arc forming, initial load voltage because Rload and rapp(t) actually remain in circuit.

vload(t): =iraw(t)·zload(t) vload(0)=231.0 zload(0) must be large.

Increased voltages appear along the line length and across the load resistance, a cycle 700, as shown in FIG. 7.

Initial capacitive stored energy: Any initial voltage drop across a series circuit capacitor will oppose line current change. However, in this circuit capacitance is basically a parallel function. We can look at an expansion of net circuit impedance, Zcct(s), to find any effective series capacitive component now that the changing load resistance has been defined.

In a simple initially powered (L+C+R) circuit, i(0) and Vc(0), circuit values produce current momentum and voltage change. The numerator is the Excitation function that includes all initial stored energy.

$$I(s) = \frac{V(s) + L*i(0) - \frac{V_c(0)}{s}}{s*L + R + \frac{1}{s*C}} = \frac{\text{Excitation}}{Z_{cct}(s)}$$

$$Z_{cct}(s) := R_{sup} + R_{cb} + 2*R_{contact} + Z_{in}(s)$$

$$Z_{cct}(s) \xrightarrow[\substack{\text{simplify}\\\text{series},s\\\text{float},4}]{} 3.81 - 0.1088*10^6*s + 0.3711*10^{10}*s^2 -$$

$$0.1266*10^{15}*s^3 + 0.4319*10^{19}*s^4 - 0.1474*10^{24}*s^5$$

With the chosen zero leakage and onset current conditions there are no net series, 1/s, capacitive circuit series impedance factors in the denominator, Zcct(s): Vc(0)=0.

Capacitive initial energy is not a design factor; any effect is already included. Initial per-meter capacitive voltage is set here by per-meter circuit resistance.

The analyzed circuit model attempts to allow a simple view of the effect of the fault action; the fault proximity is modeled simply as a decreasing large resistance that shunts the load resistance. The elimination of line leakage current and any current change at the fault onset has allowed mathematical simplification and a view of the basic circuit action.

In reality, the approaching fault impedance may add some value of an effective and increasing small fault capacitance which could affect the reported initial line reaction via Zin(s). The power supply internal impedance and any unmodelled connecting wire impedances are also probably not simply resistive. User calculation can allow for these effects.

Initial Supply Raw Current and Line Resistance Rates of Change:

$$i_{raw}(t) :=$$

$$51.24*\exp(-0.0001796*t) + 8.797*\exp(-0.1121*10^6*t) + 9.995$$

$$i_{raw}(0)*A \to 70.032*A; di_{raw}(t) := \frac{d}{dt}i_{raw}(t); di_{raw}(0)*\frac{A}{s} = -9.9*10^5 \frac{A}{s}$$

Initially almost one million amperes per second and a high current.

Further, for a plot 800 (as shown in FIG. 8) associated with Line raw current rate of change, A/s. Looking at the instantaneous changing time dependent real value of the Zin(s) line input impedance numerator, $$P(t) = Z_{load}(t)*R_{load} = \frac{R_{load}*r_{app}(t)}{R_{load} + r_{app}(t)} - R_{load} = \frac{-R_{load}^2}{R_{load} + r_{app}(t)}$$

$$P(t) := \frac{-R_{load}^2}{R_{load} + r_{app}(t)}; dP(t) := \frac{d}{dt}P(t), dP(0) \xrightarrow{float,3} -95.6 \frac{\Omega}{s}$$

At t=0, the rate of change of the numerator of the time dependent part of Zin(s) is relatively large and negative, triggering the circuit action.

Power Feed Line Input Voltage:

$$V_{raw}(t) := E_{sup} - i_{raw}(t) \cdot (R_{sup} + R_{cb} + 2 \cdot R_{contact})$$

$V_{raw}(0) = 22.06$; E0, the static line input voltage was 35.81 volts. Faulted line input voltage falls by 13.75 volts. These plots show an almost instantaneous initial action for this circuit model.

Further, a plot 900 (as shown in FIG. 9) is associated with the power feed line input voltage.

Power Line Working Input Resistance:

$$R_{lineraw}(t) := \frac{V_{raw}(t)}{I_{raw}(t)};$$

This equation is true because line initial stored energy has been included in calculations.

Falling instantly from $(D*R_1 + 2*R_{contact} + R_{load})*\Omega \xrightarrow{float,4}$ $$3.581*\Omega \text{ virtual switch action,}$$

$$R_{lineraw}(0)*\Omega \xrightarrow{float,4} 0.315*\Omega$$

A drop of $3.581 - 0.315 \to 3.266\Omega$ $R_{load} \to 3.298$.

Further, a plot 1000 (as shown in FIG. 10) is associated with the power line working input resistance.

Load voltage and fault power: This total action was not known to be described or published before.

$$V_{loadraw}(t) := i_{raw}(t)*Z_{load}(t)$$

$$V_{loadraw}(0)*y \xrightarrow{float,5} 230.97*V; iR_{app}(t) := \frac{V_{loadraw}(t)}{R_{app}(f)}; iR_{app}(1) = 61.2$$

$$W_{raw}(t) := V_{loadraw}(t)*iR_{app}(t)*W;$$

Instantaneous fault power. For the next plot time marker, $\tau = 470*10^{-9}$ $$W_{raw}(\tau)*W \xrightarrow{float,4} 3.97*\Omega; iR_{app}(\tau) = 31.6; V_{loadraw}(\tau) = 125.4$$

The values of the shown initial large approaching fault voltage spike and available fault peak power of about 3958 W on this low voltage circuit might damage wire insulation or circuits or trigger a fire or an explosion due to a spark. The simple low supply voltage source, power and approaching fault function were deliberately chosen to reveal this possible close approaching fault situation. Further, a plot 1100 (as shown in FIG. 11) is associated with Line fault response.

Initial circuit action that establishes the claimed CJC circuit action: In use, the physical positioning and impedance of the CJC component must be considered. A long line between the component and the power source may add significant inductance, resistance and crosstalk power to the effective power source impedance and affect voltage redistribution. A good place would be close to the power source exit terminal.

1. We find the value of a small practical inductance, Lcoil, here choosing the CSCT reluctance calculation method for greater accuracy, that sets the initial supply current, icjc1(0), to an acceptable value, ideally close to the static current value.
2. The ferrite core has a low physical aspect ratio and a large open window volume.
3. Static core DC magnetization will be set well below the ferrite B-H core knee point. Core reluctance is then relatively small when compared with air path values, with a relatively small variation.
4. Core mechanical data allows initial calculations of winding bobbin size and coil mean turn length, resistance and capacitance. Start/finish leads exit method must be considered; ideally, they should not enclose more ferrite.
5. A flame proof, Lcoil damping resistor value, Rdamp, if used, can be used with a 2% resistance tolerance to maintain the CJC component impedance value.
6. CJC component voltage can be calculated.
7. The effective resistance of the small core loss during the active time can be estimated.

We now have enough data to show the initial overall circuit performance. Core reluctance, with normal small variation, will be very small when compared with the large net air gap and open window values. In production, the air gap thickness and window area core leg length could be controlled.

CSCT calculations will lead to the basic CJC component, Lcoil, inductance value. The window leakage flux direction effectively puts the open window reluctance in parallel with the sum of all of the outer core leg plus air gap reluctances; this is an important consideration for the smallest CJC core component size and shape, producing a unique component configuration.

$L_{coil} := 117.3 * 10^{-6}$ H

Minimal heat for a long circuit protection time: $R_{coil} := 4 * 10^{-3}$ Ω

Small and not very important here: $C_{coil} := 32 * 10^{-12}$ F

Effective core loss resistance: $R_{loss} := 2700$ Ω

Here a place holder: $R_{damp1} := 150000$ Ω

$$Z_{cjc1}(s) = \left(\frac{1}{R_{coil} + s*L_{coil}} + \frac{1}{R_{loss}} + \frac{1}{R_{damp1}} + s*C_{coil}\right)^{-1}$$

$$n(s) = \sqrt{s*C_1*(R_1 + s*L_1)}$$

$$Z_{in1}(s) = (R_{load} + 2*R_{contact} + D*R_1) +$$

$$\frac{Z_{load}(s) - R_{load}}{\cosh(D*n(s)) + \frac{s*C_1}{n(s)} * (Z_{load}(s) + 2*R_{contact}) * \sinh(D*n(s))}$$

$$I_{cjc1}(s) = \frac{\frac{E_{sup}}{s} + I_0 * \int_0^\infty *(D*L_1 + L_{coil})}{R_{sup} + R_{cb} + 2*R_{contact} + Z_{in1}(s) + Z_{cjc1}(s)}$$

Loop excitation at $t = (0 -)$; loop impedence at $t = (0)$.

$i_{cjc1}(t) :=$ $50.9004 * \exp(-0.000178638 * t) + 9.98996 - 48.172 * \exp(-50.91.27 * t)$ Initial supply current jump control by the added series CJC component is established: Further, a plot 1200 (as shown in FIG. 12) is associated with fault onset current jump control.

$i_{cjc1}(0) \xrightarrow{float,5} 12.718;$ $i_{raw}(0) \xrightarrow{float,5} 70.032$ The initial large supply current jump has been explained and controlled; the design goal. The action now includes the CJC coil which absorbs some of the voltage change and produces much slower initial rates of change of line current and value.

The full rise in current is now much slower, taking about 1.5 ms to reach the maximum value with this low inductance CJC component, reducing initial circuit voltage stress and arcing action is less likely. Full short-circuit action is delayed and arcing prevented.

The load power feed line input impedance falls from its initial DC ohmic value when the initial load conditions change; a virtual switch action. This impedance change drives the powered loop circuit response.

This circuit should not cause any added complications with a MIL-STD 704B 50 msec power change-over event or the possibility of sporadic small increases in supply current, to avoid nuisance circuit breaker tripping.

The CJC coil inductance is too small to provide any power supply voltage ripple filtering that a higher inductance steel cored component could provide.

CJC Component Controlled Load Voltage and Fault Power:

$R_{load} \to 3.298$ $R_{app}(t) := R_{load} * 10^6 * \exp(-t * 29000000) + 10^{-4}$ $V_{loadcjc1}(t) := i_{cjc1}(t) * Z_{load}(t)$ $V_{loadcjc1}(0) \xrightarrow{float,5} 41.945$ $iR_{app1}(t) := \frac{V_{loadcjc1}(t)}{R_{app}(t)}$ $W_{cjc1}(t) := V_{loadcjc1}(t) * iR_{app1}(t)$ $iR_{app}(\tau) = 5.8$ $V_{loadcjc1(\tau)} * V = 23.1 * V$ $W_{cjcs}(\tau)8W = 134.6 * W$; Possibility of an arcing onset condition is small.

$i_{cjc1}(t) :=$ $50.9004 * \exp(-0.000178638 * t) + (9.98996 - 48.172 * \exp(-5091.27 * t))$ $di_{cjc1}(t) := \frac{d}{dt} i_{cjc1}(t)$ -continued $$di_{cjc1}(0) * \frac{A}{s} \xrightarrow{float,3} \frac{0.245 * 10^6 * A}{s};$$

A reduced rate of an initially smaller current

Controlled fault response: Further, a plot 1300 (as shown in FIG. 13) is associated with controlled fault response.

The initial unprotected line load high power spike is greatly reduced and controlled. Chances of a serious initial fault onset arc are greatly reduced. The approaching peak fault power is reduced from about 3958 W to 135 W.

CJC Component Voltage (Shown Positive):

$$V_{cjc1}(s) = I_{cjc1}(s) * Z_{cjc1}(s)$$

$$\frac{D*M}{c} = (2.5 * 10^{-8}) * s$$

$$V_{cjc1}(c) := 0.2034 * \exp(-0.0001785 * t) + 36.17 * \exp(-5096 * t) + 0.03995$$

$V_{cjc1}(0) = 36.4$; This voltage changes the power feed line input voltage.

$$D * \sqrt{L_1 * C_1} \xrightarrow{float,4} 0.5041 * 10^{-7};$$

Approximate line transmission time, seconds.

For a plot 1400, as shown in FIG. 14, the line 50 ns transmission time lags the immediate voltage law redistribution action.

Power Feed Line Input Voltage:

vline1(t)==Eenp−vejc1(t)−icjc1(t)·(Rsup+Rcb+2·contact)vline1(0)·V=−1.2V

For a plot 1500, as shown in FIG. 15, the initial reduced vline(t) value is forced by the line input impedance change and the CJC component. Its initial rate of change is small and controlled. This is a virtual switch action.

Working Power Line Input Resistance with Allowance for Stored Energy:

$$Z_{line1}(t) := \frac{V_{line1}(t)}{i_{cjc1}(t)};$$

The external circuit fault driver triggers this response. At $t = (0-)$:

$$R_{line} = D * R_1 + 2 * R_{contact} + R_{load} = 3.652\Omega$$

$$Z_{line1}(0) * \Omega = -9.6 * 10^{-2} * \Omega$$

Further, a plot 1600 (as shown in FIG. 16) is associated with working power line input resistance with allowance for stored energy.

The coil static magnetization has been set smaller than the ferrite B-H curve knee value. This stabilizes operation and produces a relatively small core reluctance value and variation. Basically, all magnetizing current effects will be handled by the flux air path and core air gap reluctances. The chosen ferrite cores used produced a low height physical profile and a large unused plan view window area, centralizing the center leg.

ER64/13/51 Planar core Ferroxcube or similar ferrite core data is available on line. PLT64/50/5 Plate core. Air gap 0.5 mm, Ferroxcube 3C95 material or similar can be used; an E-I combination with a shared air gap spacer. Equal air gap values are not a general requirement.

Published CSCT papers, books and mathematics were used to examine the possible coil/air gap physical construction.

The open window reluctance is found and air gap and turns count adjusted. The calculated inductance of Lcoil is iterated until a construction is found that keeps the core reluctance value low under higher current circuit conditions. Initial control action is finished while the power supply current is still small.

A simple view of the open window volume reluctance: An aim of this disclosure is simplicity of understanding. There are two, perhaps weakly connected, air-path reluctance systems.

The center leg air gap with its effective reluctance decreased and area increased by the CSCT calculations. This effective air gap volume will lie inside the mechanical coil diameter.

The continuing magnetizing field on the outer face of Lcoil in the open window volume.

If the Lcoil wound length does not fully cover the whole of the center leg ferrite and its air gap lengths then these two air path systems might interact. It will be realized that the CSCT calculation is just an improved description of physical reality and only an inductance measurement of an accurately physical measured finished unit and its parts will settle what is important.

We make the practical assumption that the center leg and air gap are covered by the wound coil length and that the coil wound length is known.

This mechanical assumption means that any magnetizing flux that enters the open window volume does not shunt the center leg airgap.

On the outside surface of the coil, the window flux flows basically in parallel that in the core outer gapped leg paths. This puts a reluctance in series with the center leg path, consisting of the parallel paths of the open window reluctance and the reluctance of the core outer gapped legs, plus the remaining series core path lengths. Actual inductance measurement of a prototype sample agreed with this approach.

An easily calculated value of the open window reluctance was needed. Where the magnetizing flux loops over the coil ends, towards the core window and outer legs, it may be modeled with orthogonal components. Narrow top and bottom paths close to the local low reluctance ferrite will see a long and narrow box with high reluctance and may be considered as part of the local core flux. This leaves just the vertical component of magnetic flux parallel to the coil outer surface window area height.

Measurements and thoughts: The initial CSCT calculated value of Lcoil was 39 µH using standard purchased ferrite nominal dimension values. Gapped core pieces were glued together.

The calculated open window reluctance increased Lcoil to 117.3 µH, a 200% increase. The measured prototype inductance was a,1% accurate, value of 114.1 µH.

The window volume flux path was useful!

The CJC component inductance, Lcoil, could theoretically have been an air cored coil. Precise winding and construction would be needed to control inductance variation and there would be no free core window space to produce an inductance increase and coil turns and resistance decrease. It would probably need a shielded enclosure to be protected from local or EMP electromagnetic fields.

The typical smoothed ripple on a three phase 400 Hz rectified supply voltage will have no practical effect on the CJC voltage or basic circuit operation time with a small Lcoil inductance value.

A good product must handle a reasonable range of used supply currents and voltages and circuit component variations.

A paper design exercise to demonstrate the large range of control with this basic system was done for a supply voltage of 63.5 volts. Using this 25 feet long line and the same CJC coil, five of the AGM batteries in series, and a 10 A load initial current, the initial supply jump current was reduced from 81 A to 10.4 A, with a peak fault power reduction to 154 W from 9300 W for this use.

A longer line paper design exercise with this basic system was done. Using four of these 25 feet lines to make the line and the same CJC coil, three of the AGM batteries in series, and a 10 A load initial current, the initial supply jump current was reduced from 42 A to less than 13 A, with a peak fault power reduction to about 112 W from 1096 W. Other line lengths, load currents, voltages, or fault events may generate different circuit values and responses.

The large number of possible constructions of the CJC component and power feed lines, based upon the use of the new transitional charged line input impedance equation and the design process shown here, can be adapted for current jump control of a wide range of power supply circuits. A more enclosed window area or gapped pot core type construction would be magnetically more efficient and coil connections might exit through the air gap space.

It is possible to adjust the active coil wound width to be close to the core window height. The ferrite beyond the center leg ends could have an annular trench to recess the coil bobbin and coil turn exit means, ideally positioning only the coil in the window area to control reluctance and minimize horizontal component window flux leakage. With an enclosed window area construction, using the air gap space and this trench could provide an easy coil lead exit connection path. The use of an annular trench could also ease the tool access problem for slightly grinding the center leg to control its area.

The use of a coil wound, perhaps one turn per layer, with a single insulated copper tape could ease connection problems while forming a very low resistance coil.

The use of a ferrite core set can allow specific grinding of select core dimensions to reduce the variation in the reluctances of the CJC component air flux paths; this is generally not practical if a steel lamination core is used. The quality control process cost will also benefit.

The use of a pair of these E-cores or a longer pot-core type of construction would allow more turns or the use of an insulated tape wound coil with a low resistance. This could be of value in higher voltage and current circuits.

The effect of any core reluctance change is small; supply current change during the initial fault onset control time is small. The relatively large open window shape reluctance tends to counter minor ferrite or air gap dimensional variations.

Three parallel power line circuit feed with one line faulted: The power feed lines may have different lengths and surge impedances while sharing the design battery current. The number of lines is a design choice.

Three 7.62 m, parallel connected, current sharing circuits using 22 gauge wire were modeled and one was faulted. Unfaulted lines were modeled as loaded symmetrical Pi networks as they responded only to input voltage variation. Three separately faulted loads could be handled.

Each line could have a separate circuit breaker instead of a single main supply breaker. Other lines will then just see a very short power feed event. The core obviously responds to magnetization from any source; unconnected circuits with separate Lcoil coils could be handled.

Circuit Iterative Data:
  Rdamp2 $\Omega$ Rdamp2==470
  CJC Coil inductance H Lcoil=1.2·10$^{-4}$
  Core loss $\Omega$ Rloss=2.8·10$^3$
  CJC Coil resistance $\Omega$ Rcoil==0.004
  CJC Coil capacitance F Ccoil=32·10$^{-12}$
  Contact resistance $\Omega$ Rcontact=4.5·10$^{-3}$
  Line loads $\Omega$ R2load=10.6

$$i_{sup2}(t) := 43.675 * \exp(-0.00014006) + 9.802 - 41.365 * \exp(-5831.9 * t)$$

$$i_{sup2}(0) \xrightarrow{float,5} 12.106;\ i_{sup2}(1) \xrightarrow{float,5} 53.471$$

Further, a plot 1700 (as shown in FIG. 17) is associated with the circuit.

Circuit with parallel inductance. Lset, helping to set the fault onset current change and produce an immediate action pulse: We now look at a finer control of any initial supply current jump at fault inception and a method of warning of a possible large energy event when a faulted load is removed.

A particular investigation may make it difficult to use standard accurate Rdamp resistor values. The use of a small value, possibly damped, inductance in series with Rdamp can ease this problem.

A small, and possibly resistively damped inductor, Lset, is connected in series with a selected coil damping resistance, Rdamp3. In conjunction with Rdamp3 and the possible Lset parallel damping resistor, RQ3, the number of damped coil turns can be finely adjusted to aid the setting of the supply current jump at fault inception. The coil reactance effectively replaces a very large value of Rdamp while allowing a larger damping current.

The practical air cored coil used here had a simple form, but it could take any useful form. Lset could be made as one winding of a transformer to provide a free floating signal for a circuit protection device or other use such as a possible pre-arc warning.

Typically a powered circuit is provided with a fuse or circuit breaker that operates when the supply current has risen to an increased value for some time. A current limited SCR can act as a fast crowbar, adding enough extra current to enable early circuit protection from a fault removal arcing event. An SCR gate drive pulse, which could be delayed, will be a relatively small load and have an adjustable effect upon the main circuit operation, or some other use.

The overall CJC component impedance was set for this design example so that standard 2% value tolerance, flame proof, damping circuit resistors could be used. This reduces overall CJC component impedance variation.

The turn by turn design construction of Lset, here an air cored coil (90 turns of 30 AWG insulated wire), that was used here, is part of an iterative process which may change other circuit values. The easily varied value of Lset during the design process is then a fine control that helps to set the net CJC impedance. Here the circuit values have been adjusted to provide a useful action from Lset.

CJC Coil Circuit Iterative Data:
  Ramdp3: $R_{damp3}$:=33 $\Omega$
  CJC coil inductance: $L_{coil}$=117.3*10$^{-6}$ H Core loss: $R_{loss}$=2700 Ω
CJC coil resistance: $R_{coil}$:32 0.004 Ω
Lset damping: $RQ_3$:=1500 Ω
CJC coil capacitance: $C_{coil}$:=$32*10^{-12}$ F
Lset: $L_{set}$→0.00001471 H
Lset resistance: $R_{set}$→0.678 Ω

$$Z_{c1c3}(s) =$$

$$\left(\frac{1}{R_{coil}+s*L_{coil}} + \frac{1}{R_{loss}} + s*C_{coil} + \left(R_{damp3} + \frac{RQ3*(R_{set}+s*L_{set})}{RQ3+R_{set}+s*L_{set}}\right)^{-1}\right)^{-1}$$

$$I_{cjc3}(s) = \frac{\frac{E_{sup}}{s} + I_0*(D*L_1+L_{coil})}{Z_{cjc3}(s)+Z_{in3}(s)+R_{sup}+R_{cb}+2*R_{contact}}$$

$i_{cjc3}(0) =$ $50.7955*\exp(-0.000178368*t) - 47.7947*\exp(-5072.9*t) + 9.9877$ $i_{cjc3}(0) \xrightarrow{float,4} 12.99$ $i_{cjc3}(1) \xrightarrow{float,4} 60.77$ $V_{load3}(t):= i_{cjc3}(t)*Z_{load}(t)$ $V_{load3}(0)*V = 42.8$ V Further, a plot 1800 (as shown in FIG. 18) is associated with CJC coil circuit.

The initial current jump has been controlled to a reasonable value to subdue a load voltage spike while allowing a low impedance control pulse in the Lset operation.

Lset Coil Action Voltage and Current:

$$I_{damp3}(s) = \frac{V_{cjc3}}{R_{damp3} + \frac{RQ3*(R_{set}+s*L_{set})}{RQ3+R_{set}+s*L_{set}}}$$

$$I_{pulse3}(s) = I_{damp3}(s) * \frac{\frac{1}{R_{set}+s*L_{set}}}{\frac{1}{RQ3} + \frac{1}{R_{set}+s*L_{set}}}$$

$V_{pulse3}(s) = I_{pulse3}(s)*(R_{set}+s*L_{set})$ $V_{pulse3}(t):=$ $0.002772*\exp(-0.0001784*t) + 0.4808*\exp(-4900*t) + 0.0005451$ $I_{pulse3}(t):=$ $0.0040891*\exp(-0.00017837*t) + 0.70857*\exp(-4959.9*t) + 0.0008$ $V_{pulse3}(0) \xrightarrow{float,3} 0.484$ $I_{pulse3}(0) \xrightarrow{float,3} 0.713$ Further, a plot 1900 (as shown in FIG. 19) is associated with Lset coil action voltage and current. A clean and low impedance pulse is available at fault onset while the core magnetization is below the B-H loop knee point and the supply current increase is small. This could power protection from, or warning of, a possible future fault release arcing current.

Lset could be part of a simple two coil transformer to produce a low impedance dc-free pulse that could provide a suitable feed for an SCR gate or other circuit that could obviously be delayed. A much larger voltage is available from an extra turn somewhere on the core, or with a DC component, at the CJC component exit.

Further, the present disclosure describes the following:
1. A novel and mathematically derived passive component, the CJC component, is serially connected in a faulted closed loop power supply circuit to control the faulted circuit impedance change. A new systematic design approach has been created and explained that shows why the initial jump current increase occurs and how to control it with a minimal inductance value.
2. The CJC component controls the sudden rise of power supply and load currents that occurs when a working power feed line receives a sudden overload electrical fault. Calculation of component values shown here is dependent upon the use of a new equation development describing the transient input impedance of a practical, faulted, finite length charged transmission line with low line leakage loss. System component values are tuned to control a particular power supply situation but will handle a typical usage range of currents, voltages, and line lengths.
3. Component values also depend upon the use of derived equations and the mathematical and physical reasoning that justified the fault onset condition.
4. The system sets or controls the net loop circuit impedance at the fault onset time.
5. The system lowers the normal rapid increase of the power supply and load current towards the available initial fault value.
6. Controls the initial jump in load voltage and current caused by an approaching fault impedance.
7. Controls the value and rate of change of the power supply current at and after the fault onset time.
8. The system uses a virtual circuit loop impedance switch action at the fault onset time.
9. It provides the protection of all claims for parallel fed lines sharing the design supply current, or unconnected lines with the same net current.
10. It shows the use of a ferrite cored inductor where a steel cored device is typically used.
11. It does not need to use an added capacitor.
12. It does not need to use a semiconductor device.
13. It deliberately uses the open window space reluctance of the CJC component main coil inductance assembly, Lcoil, to usefully increase its inductance value with fewer coil turns.
14. It produces in one CJC component variation at fault onset, a low impedance pulse due to the use of the Lset coil.

The immediate availability of this effect can give an advanced warning of a possible high energy event, such as an electrical arc, before the circuit fault is released, to activate or delay circuit protection or for some other function. If the described two winding forms of the possible Lset coil construction are not used, an extra coil turn around the core can provide a larger DC free pulse or the output of the CJC component will provide a large pulse with a DC component.

15. An enclosed window area core type is more magnetically efficient, perhaps using the air gap space to allow coil connections and an annular trench, burying the coil bobbin ends inside ferrite area to align the wound coil height with the window height.

Although the invention has been explained in relation to its preferred embodiment, it is to be understood that many other possible modifications and variations can be made without departing from the spirit and scope of the invention.

REFERENCES

1. Complex Variables and Applications James S. Brown Ruel V. Churchill McGraw Hill International Editions Sixth Edition 1996
2. Modern Electromagnetic Fields P. Silvester Prentice-Hall Inc, 1968
3. The Schwarz-Christoffel Transformation and its Applications—A Simple Exposition Miles Walker Oxford University Press, 1933 Dover publications, 1964
4. IEEE TRANSACTIONS ON POWER ELECTRONICS, VOL. 12, NO. 4, July 1997 Air-Gap Reluctance and Inductance Calculations for Magnetic Circuits Using a Schwarz-Christoffel Transformation Arun Balakrishnan, Member, IEEE, William T. Joines, Senior Member, IEEE and Thomas G. Wilson, Life Fellow, IEEE
5. Eighth International Conference on Power Electronics-ECCE Asia May 30-Jun. 3, 2011, The Shilla Jeju, Korea A Novel Approach for 3D Air Gap Reluctance Calculations J. Muhlethaler, J. W. Kolar, A. Ecklebe Power Electronics System Laboratory, ETH, Zurich.

What is claimed is:

1. A device for controlling change in an impedance of a power supply circuit during a fault, the device comprising:
a current jump control (CJC) component configured to be electrically connected with the power supply circuit in a series connection on a power source side of the power supply circuit between a power source and the power supply circuit for controlling the change in the impedance of the power supply circuit during the fault, wherein the CJC component comprises at least one inductor, wherein the at least one inductor is associated with at least one specific value of at least one characteristic of the at least one inductor, wherein the at least one specific value of the at least one characteristic is based on at least one equation describing a transient input impedance associated with a practical, faulted, and finite length charged transmission line.

2. The device of claim 1, wherein the at least one specific value of the at least one characteristic is further based on at least one of at least one derived equation and at least one of a physical reasoning and a mathematical reasoning justifying a fault onset condition associated with the fault.

3. The device of claim 1, wherein the at least one inductor comprises at least one ferrite core and at least one coil.

4. The device of claim 3, wherein the at least one ferrite core is of an enclosed window area core type, wherein the at least one ferrite core of the enclosed window area core type uses an air gap space to allow one or more coil connections of the at least one coil, and an annular trench for burying one or more coil bobbin ends of a coil bobbin of the at least one ferrite core inside a ferrite area of the at least one ferrite core to align a winding height of a winding of the at least one coil with a window height of a window of the at least one ferrite core.

5. The device of claim 1, wherein the CJC component comprises at least one additional inductor electrically coupled with the at least one inductor, wherein the at least one additional inductor is configured for producing a low impedance pulse based on a fault onset of the fault, wherein the low impedance pulse is used for at least one warning.

6. The device of claim 5, wherein the at least one additional inductor comprises at least one additional coil, wherein the at least one additional coil is air-cored.

7. The device of claim 5, wherein the at least one additional inductor comprises at least one additional coil, wherein the least one additional coil is comprised in a winding of at least two windings of a transformer.

8. The device of claim 5, wherein the at least one additional inductor comprises at least one additional coil, wherein the at least one additional coil is wound around the at least one inductor.

9. The device of claim 5, wherein the CJC component further comprises at least one additional resistor electrically coupled with the at least one inductor and the at least one additional inductor, wherein the at least one additional resistor is in series connection with the at least one additional inductor, wherein the at least one additional resistor and the at least one additional inductor is in a parallel connection with the at least one inductor.

10. The device of claim 9, wherein the CJC component further comprises at least one resistor electrically coupled with the at least one additional inductor, wherein the at least one resistor is in a parallel connection with the at least one additional inductor.

11. The device of claim 9, wherein the at least one additional resistor is flame proof.

12. The device of claim 9, wherein the at least one additional resistor has at least 2% resistance tolerance.

13. The device of claim 1, wherein the at least one inductor is configured for allowing varying at least one value of the least one characteristic of the at least one inductor.

14. The device of claim 13 further comprising a processing device operatively coupled with the CJC component, wherein the processing device is configured for:
analyzing at least one input;
determining the at least one specific valve of the at least one characteristic of the at least one inductor based on the analyzing of the at least one input; and
generating at least one signal for the at least one inductor based on the determining of the at least one specific value of the at least one characteristic, wherein the at least one inductor is configured for setting the at least one value of the at least one characteristic to the at least one specific valve of the at least one characteristic based on the at least one signal and the allowing of the varying of the at least one value of the at least one characteristic.

15. The device of claim 14 further comprising at least one sensor communicatively coupled with the processing device, wherein the at least one sensor is configured for detecting at least one electrical parameter associated with at least one of the power supply circuit and a load, wherein the processing device is configured for generating the at least one input based on the detecting of the at least one electrical parameter, wherein the analyzing of the at least one input is further based on the generating of the at least one input.

16. The device of claim 14 further comprising at least one input device communicatively coupled with the processing device, wherein the at least one input device is configured for:
receiving at least one input action; and
generating the at least one input based on the receiving of the at least one input action, wherein the analyzing of the at least one input is based on the generating of the at least one input.

17. The device of claim 1, wherein the CJC component is further configured for performing a virtual circuit loop impedance switch action at a fault onset time of the fault for the controlling of the change in the impedance of the power supply circuit during the fault.

18. A device for controlling change in an impedance of a power supply circuit during a fault, the device comprising:

a current jump control (CJC) component configured to be electrically connected with the power supply circuit in a series connection on a power source side of the power supply circuit between a power source and the power supply circuit for controlling the change in the impedance of the power supply circuit during the fault, wherein the CJC component comprises:
  at least one inductor associated with at least one specific value of at least one characteristic of the at least one inductor, wherein the at least one specific value of the at least one characteristic is based on at least one equation describing a transient input impedance associated with a practical, faulted, and finite length charged transmission line;
  at least one additional inductor electrically coupled with the at least one inductor, wherein the at least one additional inductor is configured for producing a low impedance pulse based on a fault onset of the fault, wherein the low impedance pulse is used for at least one warning;
  at least one additional resistor electrically coupled with the at least one inductor and the at least one additional inductor, wherein the at least one additional resistor is in series connection with the at least one additional inductor, wherein the at least one additional resistor and the at least one additional inductor is in a parallel connection with the at least one inductor; and
  at least one resistor electrically coupled with the at least one additional inductor, wherein the at least one resistor is in a parallel connection with the at least one additional inductor.

19. The device of claim 18, wherein the CJC component is further configured for performing a virtual circuit loop impedance switch action at a fault onset time of the fault for the controlling of the change in the impedance of the power supply circuit during the fault.

20. A device for controlling change in an impedance of a power supply circuit during a fault, the device comprising:
  a current jump control (CJC) component configured to be electrically connected with the power supply circuit in a series connection on a power source side of the power supply circuit between a power source and the power supply circuit for controlling the change in the impedance of the power supply circuit during the fault, wherein the CJC component comprises at least one inductor, wherein the at least one inductor is associated with at least one specific value of at least one characteristic of the at least one inductor, wherein the at least one specific value of the at least one characteristic is based on at least one equation describing a transient input impedance associated with a practical, faulted, and finite length charged transmission line, wherein the at least one inductor is configured for allowing varying at least one value of the least one characteristic of the at least one inductor; and
  a processing device operatively coupled with the CJC component, wherein the processing device is configured for:
    analyzing at least one input;
    determining the at least one specific valve of the at least one characteristic of the at least one inductor based on the analyzing of the at least one input; and
    generating at least one signal for the at least one inductor based on the determining of the at least one specific value of the at least one characteristic, wherein the at least one inductor is configured for setting the at least one value of the at least one characteristic to the at least one specific valve of the at least one characteristic based on the at least one signal and the allowing of the varying of the at least one value of the at least one characteristic.

* * * * *